(12) United States Patent
Schneider et al.

(10) Patent No.: US 12,554,854 B2
(45) Date of Patent: Feb. 17, 2026

(54) MODULAR SYSTEM VALIDATION PLATFORM FOR COMPUTING DEVICES

(71) Applicant: Google LLC, Mountain View, CA (US)

(72) Inventors: David Ness Schneider, Sunnyvale, CA (US); Alex Levin, San Jose, CA (US)

(73) Assignee: Google LLC, Mountain View, CA (US)

(\*) Notice: Subject to any disclaimer, the term of this patent is extended or adjusted under 35 U.S.C. 154(b) by 515 days.

(21) Appl. No.: 18/045,717

(22) Filed: Oct. 11, 2022

(65) Prior Publication Data

US 2023/0116296 A1  Apr. 13, 2023

Related U.S. Application Data

(60) Provisional application No. 63/254,956, filed on Oct. 12, 2021.

(51) Int. Cl.
  *G06F 21/57* (2013.01)
  *G06F 21/85* (2013.01)

(52) U.S. Cl.
  CPC .............. *G06F 21/57* (2013.01); *G06F 21/85* (2013.01)

(58) Field of Classification Search
  CPC ...... G06F 21/57; G06F 21/85; G06F 11/2236; G06F 11/261; G06F 11/2221; G06F 11/2733
  See application file for complete search history.

(56) References Cited

U.S. PATENT DOCUMENTS 6,968,514 B2  11/2005  Cooke et al.
7,397,273 B1  7/2008  Ng et al.
(Continued)

FOREIGN PATENT DOCUMENTS

JP  2003256360 A  9/2003
JP  2004005331 A  1/2004
(Continued)

OTHER PUBLICATIONS

"International Search Report and Written Opinion", Application No. PCT/US2022/077955, Feb. 6, 2023, 16 pages.
"International Preliminary Report on Patentability", Application No. PCT/US2022/077955, Apr. 16, 2024, 12 pages.
(Continued)

*Primary Examiner* — Joseph P Hirl
*Assistant Examiner* — Aayush Aryal
(74) *Attorney, Agent, or Firm* — Colby Nipper PLLC

(57) ABSTRACT

This document describes apparatuses, systems, and techniques directed to a modular system validation platform for computing devices. The modular system validation platform includes an interface board for interfacing a host with a peripheral. The interface board includes an apparatus identifier, a first connector configured to couple to the host, and a second connector configured to couple to the peripheral. The interface board comprises interface circuitry that can be reconfigured to enable different peripherals to operate with the host using the same interface board. The interface circuitry enables the interoperability between the host and the peripheral by distributing power from the host to the peripheral and facilitating communications between the host and the peripheral. By using the reconfigurable interface board to test and troubleshoot the interoperability of the processor and the peripheral, resources, time and costs spent during the design and testing phases of computing devices may be minimized.

22 Claims, 12 Drawing Sheets

(56) References Cited

U.S. PATENT DOCUMENTS

| | | | |
|---|---|---|---|
| 7,904,864 B2 | 3/2011 | Huynh et al. | |
| 9,672,184 B1* | 6/2017 | Jain | G06F 11/2289 |
| 10,855,261 B2 | 12/2020 | Yang et al. | |
| 11,002,787 B2* | 5/2021 | Wolff | G01R 1/0416 |
| 11,144,494 B1* | 10/2021 | Kao | G06F 13/4282 |
| 11,532,906 B2* | 12/2022 | Huang | H01R 12/7076 |
| 11,546,992 B2* | 1/2023 | Hill | H05K 3/36 |
| 12,436,900 B2 | 10/2025 | Levin et al. | |
| 2007/0250136 A1* | 10/2007 | Karunasiri | A61N 1/36038 |
| | | | 607/56 |
| 2008/0133165 A1 | 6/2008 | Iwamoto et al. | |
| 2008/0288666 A1* | 11/2008 | Hodges | G06F 13/4095 |
| | | | 710/9 |
| 2009/0147207 A1* | 6/2009 | Goto | G02F 1/13394 |
| | | | 438/30 |
| 2011/0188070 A1 | 8/2011 | Pala et al. | |
| 2015/0234768 A1 | 8/2015 | Bass et al. | |
| 2015/0261696 A1* | 9/2015 | Christian | G06F 11/3698 |
| | | | 703/25 |
| 2017/0094353 A1 | 3/2017 | Chang et al. | |
| 2018/0189159 A1* | 7/2018 | Carmichael | G06F 13/4068 |
| 2019/0087376 A1 | 3/2019 | Bolen et al. | |
| 2019/0121647 A1* | 4/2019 | Por | G06F 9/4411 |
| 2019/0277907 A1* | 9/2019 | Wolff | G01R 31/2868 |
| 2019/0281118 A1 | 9/2019 | Kim et al. | |
| 2020/0329120 A1 | 10/2020 | Preveraud | |
| 2021/0192869 A1* | 6/2021 | Conley | G07C 5/008 |
| 2021/0286693 A1* | 9/2021 | Alben | G06F 11/2733 |
| 2021/0307189 A1* | 9/2021 | Lucero | H05K 7/1422 |
| 2024/0184563 A1 | 6/2024 | Rajagopalan et al. | |
| 2024/0275423 A1 | 8/2024 | Chou et al. | |
| 2024/0289525 A1 | 8/2024 | Shanmugasundaram et al. | |
| 2025/0251945 A1 | 8/2025 | Levin et al. | |
| 2025/0252062 A1 | 8/2025 | Levin et al. | |

FOREIGN PATENT DOCUMENTS

| | | |
|---|---|---|
| JP | 2005202705 A | 7/2005 |
| KR | 20070025994 | 3/2007 |
| WO | 2008068994 A1 | 6/2008 |

OTHER PUBLICATIONS

"Foreign Office Action", JP Application No. 2024-522111, Jun. 3, 2025, 4 pages.

"Notice of Allowance", U.S. Appl. No. 18/430,218, Aug. 19, 2025, 7 pages.

"Non-Final Office Action", U.S. Appl. No. 18/430,119, Nov. 4, 2025, 13 pages.

* cited by examiner

MODULAR SYSTEM VALIDATION PLATFORM FOR COMPUTING DEVICES

CROSS-REFERENCE TO RELATED APPLICATIONS

This application claims priority to U.S. Provisional Application Ser. No. 63/254,956, filed Oct. 12, 2021, the disclosure of which is incorporated by reference herein in its entirety.

BACKGROUND

Hardware system design often involves integrating a central platform (e.g., a platform including a specific processor) with a set of peripherals (e.g., cameras, keyboards, hard drives) to form a new platform based on the specifications and features desired for an end product. Some of the peripherals may provide a core function to the new platform, such as an embedded controller, that controls many aspects of a power system and peripheral interaction. Other peripherals may be more of an accessory, such as input devices or storage interfaces (e.g., secure digital card (SD card) slots). Many of these peripherals have interoperability requirements that include data signaling, level shifting, power, and power sequencing specific to the peripheral.

One approach to designing and testing new platforms is to copy reference circuitry schematics for connecting the peripherals from a current platform to a circuit board of the new platform and adjusting the designs to meet sequencing and signaling requirements of the new platform. This process, however, is typically error-prone and can result in improper voltages, undesired power leakage paths, cost-inefficient interfacing, and other integration issues. Often, issues are found and corrected on a next circuit board, only to be regressed on a follow-on circuit board as a combination of different issues. This regression may occur if more peripherals are added to the follow-on platform or if one or more of the peripherals on the new platform are exchanged with different peripherals on the follow-on platform. These integrations may require extensive, time-consuming review, circuit board fabrication iterations, and testing to ensure interoperability of the integrated hardware system.

SUMMARY

This document describes apparatuses, systems, and techniques directed at a modular system validation platform for computing devices. Aspects described below include an apparatus for validating a system, including a host and at least one peripheral. The apparatus includes a printed circuit board (PCB) including an apparatus identifier. The apparatus further includes a first connector coupled to the PCB and configured to couple to the host and a second connector coupled to the PCB and configured to couple to the peripheral. The apparatus further includes interface circuitry coupled to the PCB between the first connector and the second connector, the interface circuitry configured to enable the host to operate with the peripheral by distributing power from the host to the peripheral or facilitating communication between the host and the peripheral. Aspects of the present disclosure may allow for rapid prototyping or more efficient development of new computing devices or systems. In some cases, the reconfigurable interface circuitry enables the apparatus to be reused for testing multiple processor and peripheral combinations without having to redesign and fabricate a new validation platform, and thus resources, time and costs associated with the designing and prototyping of new computing devices may be minimized. Furthermore, aspects of the present disclosure may allow for dynamic reconfiguration of the interface circuitry so that alternate implementations of the interface circuitry may be tested without uncoupling the host and peripheral. This may allow for rapid circuit optimization, without the time and resources involved with redesigning and building a new validation platform.

This Summary introduces simplified concepts related to a modular system validation platform for computing devices, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a modular system validation platform for computing devices are described in this document with reference to the following figures. The same numbers are often used throughout the drawings to reference like features and components:

FIG. 6-1 illustrates the interface board from FIG. 2 that can be implemented in a modular system validation platform for computing devices;

FIG. 6-2 illustrates an example muxing interface board of a modular system validation platform for computing devices;

FIGS. 6-3 and 6-4 illustrate example configurations of a muxing interface board in accordance with one or more aspects;

FIGS. 8-1 and 8-2 illustrate detailed example method(s) for operations implemented by an interface board of a modular system validation platform for computing devices.

DETAILED DESCRIPTION

Overview

Figure 1:
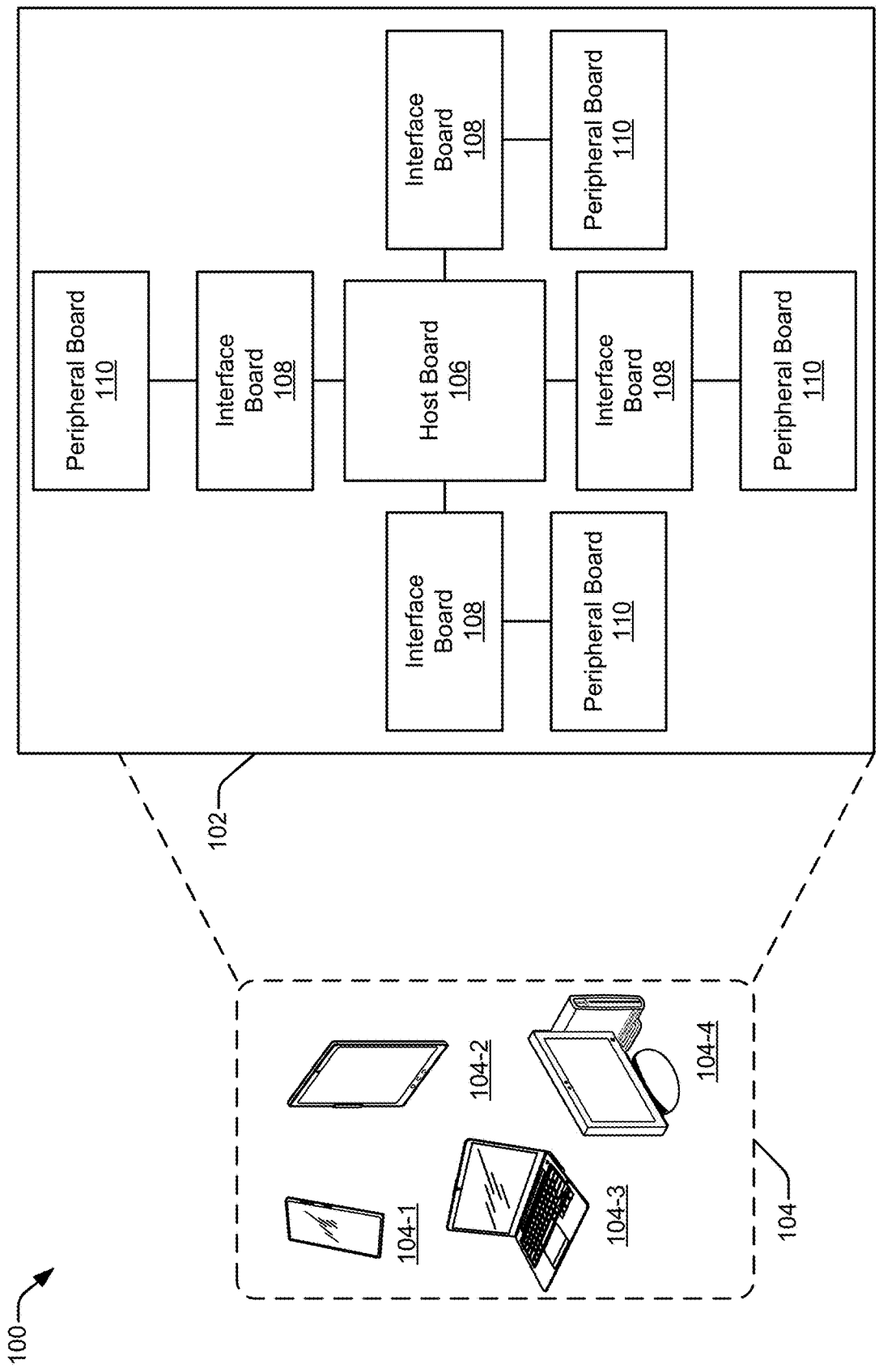
FIG. 1 illustrates an example environment of a modular system validation platform for computing devices.

Many processor manufacturers create a reference platform that enables system designers to test a particular processor with multiple types of peripherals. These reference platforms typically include generic or predefined input/output (I/O) interfaces that enable limited plug-and-play functionality for basic data interface testing of different peripherals devices or chips. Although convenient for determining the functional accuracy of the peripheral design, the generic I/O interfaces of the reference platforms generally do not translate directly to a finalized or marketable system design. The interface to each peripheral is often simplistic, non-configurable, and limited to avoid various integration issues. These reference platforms focus on processor bring-up, but often, the platforms are either not modular or have limited modularity for different types of peripherals. For the processor bring-up, the peripherals are plugged into the simple interfaces, and the system is powered on to check function or compatibility in a single power state or with a single configuration of peripherals. Additionally, peripherals for these reference platforms are often vendor-specific and statically configured for a particular reference platform. A peripheral module designed for one vendor's reference platform may not work on a different vendor's reference platform. Thus, the designs of the reference platforms may form a general basis for the circuitry that is capable of interfacing the processor with the peripherals, but typically requires re-engineering and iterative testing to achieve reliability and functionality required for the end product (e.g., a computing device being designed), resulting in wasted resources and effort. As the project progresses beyond a preliminary schematic stage, the reference platform may be neglected and become less useful for bringing up new or revised peripheral configurations.

In contrast with preceding techniques for system validation, this disclosure describes aspects of a modular system validation platform for computing devices that includes an apparatus (e.g., an interface board) for interfacing a processor (e.g., the processor present on a host board) with a peripheral (e.g., the peripheral being present on a peripheral board). Each interface board, host board and peripheral board is a module. The modules can be arranged in different configurations depending on the desired features of the end product. In aspects, the interface board includes an identifier that may be a digital ID code or circuitry that identifies the interface board. The identifier can be provided to the host board and enables the host board to verify that the interface board is expected in the current configuration of the validation platform. The interface board comprises circuitry that can be reconfigured to enable different peripheral boards to operate with the processor board using the same interface board. The interface board may also include circuitry that monitors the power and communication signals that are being interfaced between the host board and the peripheral board. In some implementations, the circuitry of the interface board enables configuration and/or monitoring of electrical nets, nodes, or paths (e.g. signal lines or power rails on internal PCB layers) that are not exposed on external layers or contacts (e.g., test points or connector headers) of the interface board or peripheral board. Thus, the interface board may enable control (e.g., level shifting or power sequencing) and measurements of electrical signals that are not typically exposed by preceding host, peripheral, or adapter boards. Any specific configuration (e.g., hardware settings or associated metadata) of the interface board circuitry may also represent or correspond with a hardware schematic that can be used when generating schematics for a computing device that includes the processor and peripheral, thereby precluding the need for iterative board turns to re-verify interface circuitry.

The modular system validation platform for computing devices (e.g., a modular reference platform), as described herein, may provide a modular reference platform that is highly reusable and applicable to an end product or finalized system design for a computing device. Some of the described advantages may be obtained by a configurable interface layer (e.g., interface board) that couples a host board to one or more peripheral boards. In an example, an interface board can ingest a configuration file provided by a host board (e.g., system configuration module) and provide level shifting and versatile power sequencing between the peripheral and the host board that includes a processor. The level shifting may be configured to be direct-connect, to emulate a common level-shifting technique, or a combination thereof. The power sequencing may be configured to take an arbitrary logical combination of signals from a connector coupled to the host board and use them to control load switches that distribute power to the peripheral board. In a simple non-sequenced configuration, the load switches may always be on, while other sequenced configurations may sequence multiple power rails of the peripheral to simulate bring-up, standby states, sleep states, bring-down, and so forth. Thus, circuitry specific to the modular reference platform can be implemented on the interface board, and the interface board can be physically installed between the host board and one or more peripheral boards to provide modularity and flexibility for system validation. In some cases, the interface board may be reused across any combination of host boards and peripheral boards. By centralizing the reference design complexity on the interface boards, the host boards and peripheral boards may be kept relatively simple in complexity and minimal in terms of costs. Additionally, because the configuration (or reconfiguration) of the interface boards can be automated via respective configuration files, manually configuring jumpers or switches of the interface board for each peripheral may not be required.

In aspects, to accommodate a wide range of features that may be implemented in the form of peripherals, the connectors on the interface boards, the host boards, and the peripheral boards may include many more signals and power connections than in a normal design for an end product or finalized system design. As described herein, the strategy of a modular system validation platform enables multiple types of peripherals to be connected to the host board using these enhanced yet predefined interfaces, which may include standardized data interfaces and additional sideband signaling (e.g., for configuration of the interface board). Additionally, the predefined interfaces of the interface boards, host boards, or peripheral boards can be used to test multiple platforms.

The described modular system validation platform may also increase design flexibility between implementing hardware and software configurations. The interfacing circuitry, as configured on the interface board, can be well-defined in the configuration file. This enables software to use the configuration file, the host design, and the design of the peripherals to generate final product schematics. The schematics may include optimized or compact circuitry (e.g., folded down schematics) that is found to be useful for the current platform and not include the circuitry (e.g., circuitry not configured, monitoring and debugging circuitry) that is extraneous to the end product. As such, the circuit board assemblies of the end product can be laid out and fabricated with functionality, software, and behavior that is equivalent to that validated with the modular platform.

In aspects, the modular system validation platform for computing devices, as described herein, may provide additional opportunities for telemetry and debugging aids that may not be available on preceding reference platforms. The described interface boards may be designed to provide a switching fabric that enables multiple alternative peripheral implementations, enabling comparative and highly scalable testing between solutions. For example, the interface boards may provide power measurements on power rails for individual components as opposed to a summary measurement over a batch of components. Likewise, the interface boards may enable analog monitoring of logical signals to an attached peripheral board to confirm expected behavior or monitor for voltage or current leakage issues. The electrical paths or nets of the interface boards being measured or monitored may not be exposed on external layers or contacts of the interface board, that is, test headers, leads, pads, or additional test equipment may not be needed to debug or characterize the electrical interface between the host and the peripheral. Alternatively or additionally, some interface boards may provide novel peripheral interfaces by combining multiple existing peripheral connectors into a single board.

On preceding reference platforms, many of the described features would be prohibitively expensive and resource-intensive to implement on a platform or a peripheral reference board because circuitry would have to be included on every reference board of a particular peripheral type. As described herein, a modular system validation platform that includes these features on an interface board enables a developer or laboratory setup to have one set of interface boards that can be used with any number of different host boards and peripheral boards. Additionally, removing the complex circuitry from the host boards and peripheral boards enables those boards to be manufactured for less than those of preceding static or fixed reference platforms.

Example Environment

FIG. 1 illustrates an example environment 100 of a modular system validation platform 102 for computing devices 104. The example environment 100 may represent a development laboratory for a platform manufacturer, a processor manufacturer, a peripheral manufacturer, or any person or organization that designs, manufactures, or tests computing platforms. In this example, a computing device 104 is being designed in the development laboratory equipped with a modular system validation platform 102 for computing devices.

Examples of a computing device 104 may include a mobile computing device, mobile communication device, modem, cellular or mobile phone, mobile station, gaming device, navigation device, media or entertainment device (e.g., a media streamer or gaming controller), laptop computer, desktop computer, tablet computer, smart appliance, vehicle-based computing system, wearable computing device (e.g., clothing, watch, or reality-altering glasses), Internet of Things (IoTs) device, sensor, stock management device, computing portion of a machine or piece of equipment (e.g., vehicle or robot), a server computer or portion thereof (e.g., a server blade or rack or another part of a datacenter), and the like. The illustrated examples of the computing device 104 in FIG. 1 include a smart phone 104-1, a tablet 104-2, a laptop computer 104-3, and a desktop computer 104-4.

In example implementations, the computing device 104 includes one or more integrated circuits (ICs) that correspond to a processor, memory, and peripherals of the computing device 104. The ICs may be implemented as one or more respective IC chips or IC packages that are mounted on a module, card, or a printed circuit board (PCB) of the computing device 104. Examples of a PCB include a flexible PCB, a rigid PCB, a single or multi-layered PCB, a surface-mounted or through-hole PCB assembly, combinations thereof, and so forth. Each integrated circuit can be realized as a general-purpose processor, a system-on-a-chip (SoC), a security-oriented IC (e.g., a root of trust (RoT) IC chip), a memory chip, a communications IC (e.g., a modem or radio-frequency IC), a graphics processor, an artificial intelligence (AI) accelerator, combinations thereof, and so forth. The integrated circuits can be packaged individually or together with other IC chips. The computing device 104 also includes a power system that can be implemented as one or more power supplies and a power distribution network that is configured to provide power to the ICs and circuitry of the computing device 104.

In aspects, the modular system validation platform 102 includes a host board 106 (e.g., PCB) that includes instances of the processor IC, memory IC, and power system (or power system ICs) of the computing device 104. In other words, the host board 106 may include core components of a computing device without the peripherals or peripheral interface circuitry. The memory can be random-access memory (RAM), static RAM (SRAM), dynamic RAM (DRAM), non-volatile RAM (NVRAM), or other variations of short-term memory. The host board may further include system configuration circuitry and debug circuitry. The system configuration circuitry and debug circuitry may be additional circuitry on the host board or on one or more separate PCBs coupled to the host board via respective connectors.

The modular system validation platform 102 can include one or more interface boards 108. Generally, the interface boards 108 can include reconfigurable interface circuitry designed to interface the host board 106 to one or more peripheral boards 110. As described herein, the interface circuitry can enable the selective control of power and/or signaling between the host board 106 and the peripheral boards 110. The peripheral boards 110 may include at least one peripheral (e.g., peripheral IC and associated components) to be integrated with the processor and integrated circuitry of the host board 106. In this example, four peripheral boards 110 that may include the same type of peripheral (e.g., hard-drives) or include different types of peripherals (e.g., a camera, a fingerprint reader, a mouse, a keyboard, a battery, etc.) are interfaced to the host board 106 via four respective interface boards 108. However, any quantity or combination of peripheral boards 110, based on the specifications of the computing device 104, may be interfaced to the host board 106, using interface boards 108. In some aspects, an interface board 108 may include multiple connectors (e.g., with multiplexed power and/or signaling) to interface multiple peripheral boards 110 with the host board 106. The modular system validation platform 102 may enable the interchange host boards 106 and peripheral boards 110 using the same set of interface boards 108. Further, peripheral boards 110 can be added, removed, or swapped (e.g., hot-swapped while the host board 106 is powered) to rapidly test and evaluate (compared to traditional reference platforms) different configurations of the computing device 104.

Example Architecture

Figure 2:
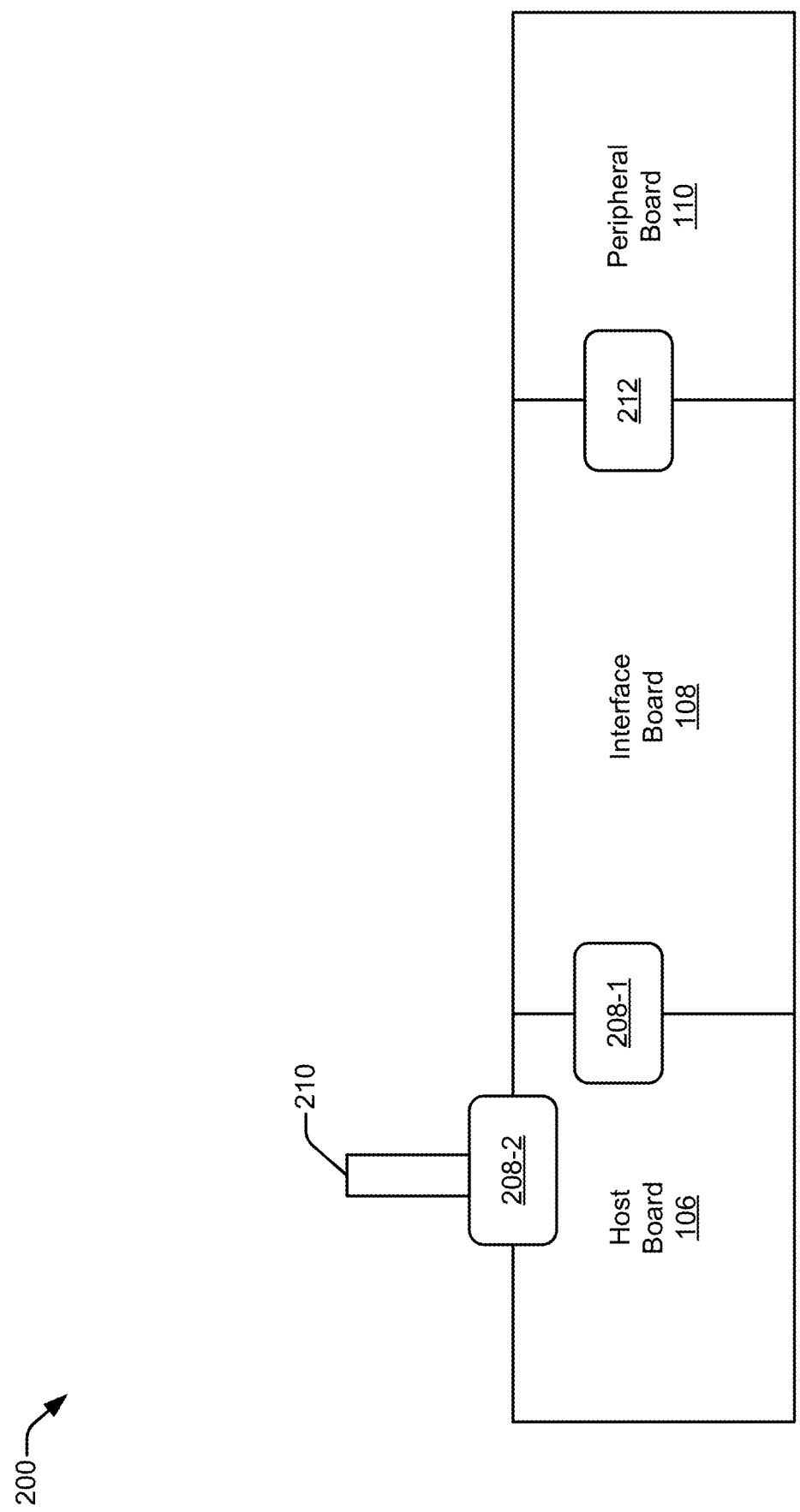
FIG. 2 illustrates an example modular system validation platform for computing devices that includes a host board, an interface board, and a peripheral board implemented in accordance with one or more aspects.

FIG. 2 illustrates an example modular system validation platform 200 for computing devices that includes a host board (e.g., the host board 106), an interface board (e.g., the interface board 108), and a peripheral board (e.g., the peripheral board 110) implemented in accordance with one or more aspects. The interface board 108 is configured to interface the host board 106 and the peripheral board 110. In some aspects, the interface board 108 can be reconfigured to interface a similar type of peripheral board as the peripheral board 110. For example, if the peripheral board 110 included a fingerprint reader (e.g., fingerprint IC and sensor) manufactured by a first manufacturer, the interface board 108 can be reconfigured to interface a peripheral board including a fingerprint reader manufactured by a second manufacturer. In other aspects, the interface board 108 can be reconfigured to interface with other types of peripherals, for example, a fingerprint reader swapped for an external hard drive.

The interface board 108 is coupled to the host board 106 by a predefined board connection 208-1. The predefined board connections 208 or connector interface may include conductors for a predefined I/O signal port (e.g., a first USB or PCIe port), one or more power rails, and/or out-of-band control lines (or second USB port) that enable the host board 106 to control or configure the circuitry of the interface board 108. The board connection 208-1 includes a connector on the host board 106 coupled to a connector on the interface board 108. The predefined board connection 208-2 represents one or more board connections 208 for connecting additional board chains (e.g., combination of interface boards 108 and peripheral boards 110) 210 to the host board 106. The additional board chains 210 may include similar peripheral boards as the peripheral board 110 or different peripheral boards from the peripheral board 110 depending on the specifications of the computing device 104.

The interface board 108 is coupled to the peripheral board 110 by a board connection 212. The board connection 212 includes a board connector on the peripheral board 110 coupled to a board connector on the interface board 108. The host board 202, the interface board 204, and the peripheral board 206 are described in more detail with reference to FIGS. 3 to 6-3, respectively.

Figure 3:
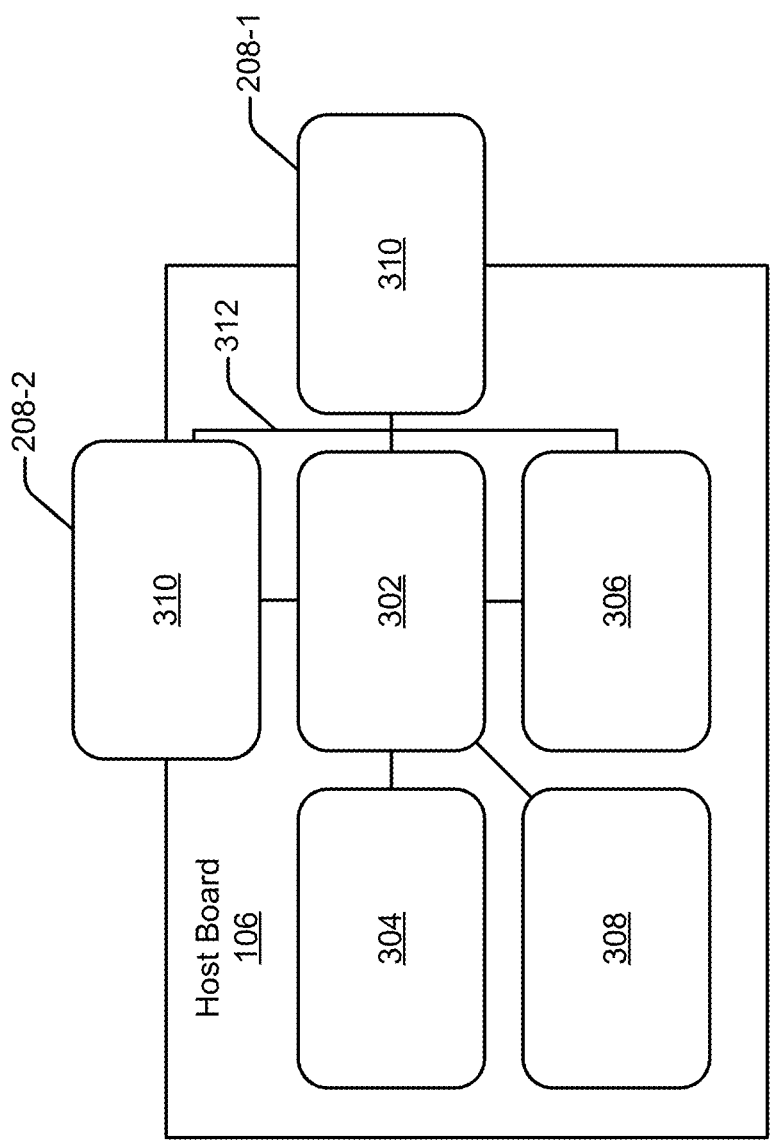
FIG. 3 illustrates the host board from FIG. 2 that can be implemented in a modular system validation platform for computing devices.

FIG. 3 illustrates the host board 106 from FIG. 2 that can be implemented in a modular system validation platform for computing devices. The host board 106 includes core components of a computing device being prototyped, such as an SoC 302, a DRAM 304, a power management integrated circuit (PMIC) 306, and an SoC debug circuit 308. In some aspects, the host board 106 can include control circuitry (not shown) with configuration data that indicates the power and communication details of the host board. The host board 106 includes one or more predefined board connectors 310 (included in the board connections 208) for attaching board chains. The core components may be coupled to one another on the host board PCB according to the specifications of the SoC 302 and the other core components (e.g., the DRAM 304, the PMIC 306).

The core components are coupled to the board connectors 310 with a predefined circuitry 312 to enable configurable signal and/or power interfaces. The predefined circuitry 312 may include multiple power and signal pathways between the core components and the board connectors 310 that may or may not be utilized depending on the board chains to be coupled to the host board 106. The multiple power and signal pathways enable many different peripherals to be tested with the core components of the host board 106. Any part of the predefined circuitry 312 not being utilized in powering or communicating with a particular peripheral may not be included in the final schematics of the computing device being prototyped.

In some aspects, the host board 106 may represent a core platform of a particular processor or SoC manufacturer. Other host boards may be similar to the host board 106 but represent core platforms of other SoC or processor manufacturers. Alternatively, similar host boards to the host board 106 can be manufactured with the same SoC but with different memory, PMIC, and the addition or subtraction of other components. However, the predefined circuitry 312 can be included on any host board and altered to accommodate the power and the signals available for a specific configuration of core components. Further, the board connectors 310 are predefined such that interface boards included with a modular system validation platform (e.g., the modular system validation platform 102) can be connected to the board connectors 310 on any host board. Any configuration of a core platform being developed can be represented as a host board similar to the host board 106.

Figure 4:
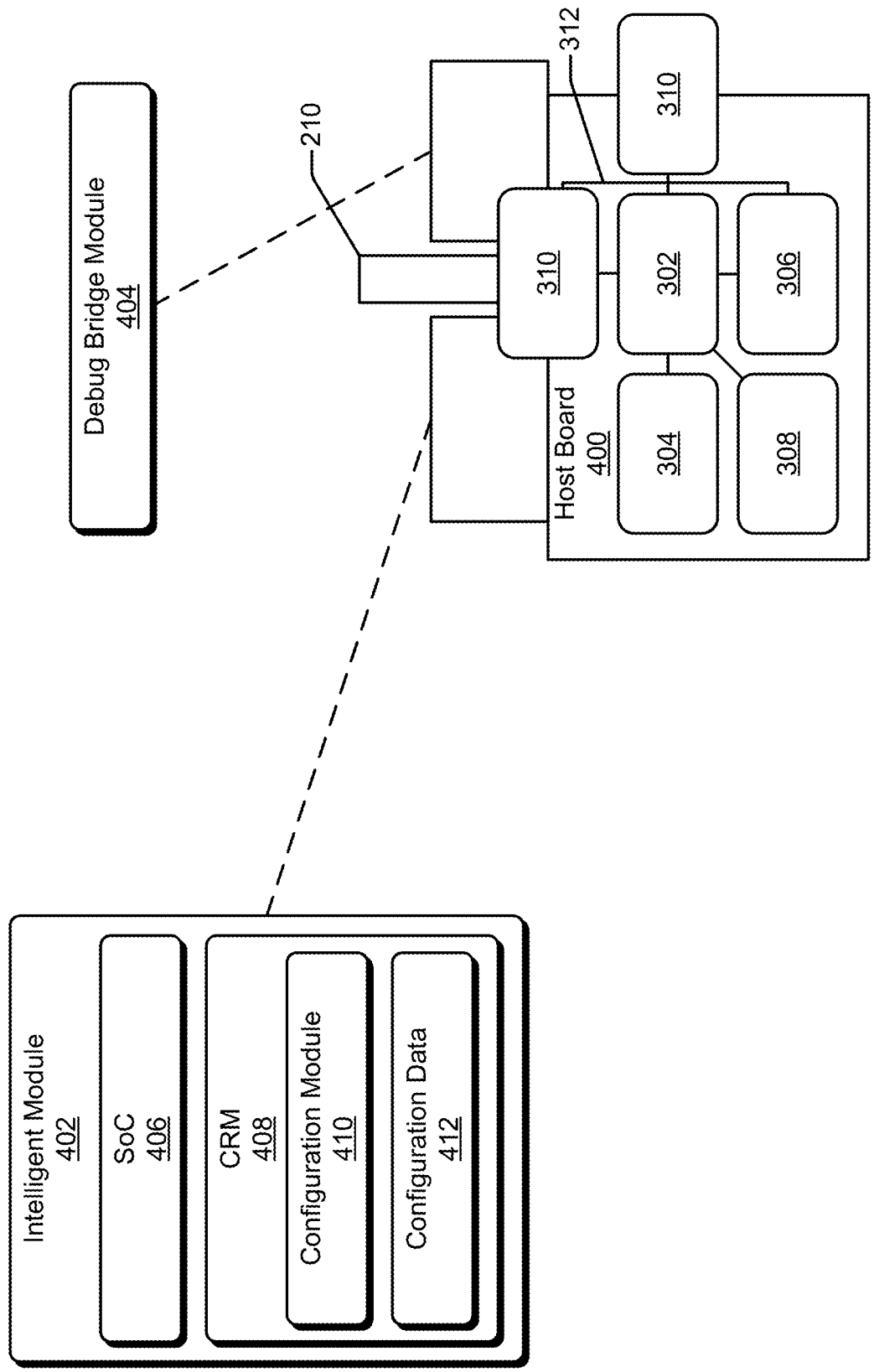
FIG. 4 illustrates an example host board that includes an intelligent module and debug bridge module in accordance with one or more aspects.

FIG. 4 illustrates an example host board 400 that includes an intelligent module 402 and debug bridge module 404 in accordance with one or more aspects. The host board 400 may be similar to the host board 106 and include the same components. As illustrated in FIG. 4, the host board 400 includes the SoC 302, the DRAM 304, the power management integrated circuit (PMIC) 306, the SoC debug circuit 308, and the board connectors 310. Additionally, the host board 400 may provide configuration and debug capabilities through the intelligent module 402 and the debug bridge module 404, respectively. In some aspects, the intelligent module 402 and the debug bridge module 404 are separate PCBs and are coupled to the host board 400. In other aspects, one or both of the intelligent module 402 and the debug bridge module 404 are additional ICs and circuitry included on the host board.

In aspects, the intelligent module 402 may control the system configuration and reconfiguration of the modular system validation platform for computing devices. For example, the intelligent module 402 may determine or select respective configuration information to provide configurations of one or more interface boards 108. In some cases, the intelligent module also includes or manages a power source that powers a control plane (e.g., for configuration aspects) of any boards included in the modular system validation platform. The control plane can include circuitry that powers and communicates with board management logic on the host board, peripheral boards, and interface boards (e.g., non-transitory computer-readable media (CRM) including an identifier, control circuitry). The intelligent module may use the control plane to configure the modular system validation platform, independent of the functional circuitry being tested.

The intelligent module can include an SoC 406 and a CRM 408 (e.g., read-only memory (ROM), flash memory, EEPROM) for storing a configuration module 410 and configuration data 412 for the platform being prototyped or tested. The configuration module 410 includes instructions, that when executed by the SoC 406, boots up the control plane of the modular system validation platform and enables the configuration module 410 to detect and identify the host board 106, the interface boards 108, and the peripheral boards 110 that are a part of the modular system validation platform. If the host board 106, the interface boards 108, or the peripheral boards 110 fail to provide identifiers or provide invalid identifiers (e.g., based on a library of the intelligent model for supported boards), the instructions may not allow the host board 106 to boot and/or disable other functions of the modular platform. The configuration module 410 also includes instructions that, when executed by the SoC 406, configure the interface boards 108 (e.g., configures level shifters, configures power sequencers and load switches) to provide power from the host board 106 to the peripheral boards 110 and establish communication between the host board 106 and the peripheral boards 110. The configuration module 410 may also include instructions for monitoring the power and communications between the host board 106 and the peripheral boards 110. The configuration module 410 may, likewise, enable reconfiguration of the interface boards 108. In one implementation, the configuration module 410 can power down the host board 106, reconfigure the interface boards 108, and then reboot the host board 106. If hot-swapping of the peripheral boards 110 is desired, the configuration module 410 can reconfigure the interface boards 108 without first powering down the host board 106 and/or power down respective ones of the interface boards 108 or peripheral boards 110 while the host board 106 remains powered.

The configuration data 412 can include the identities of the expected host board 106, the expected interface boards 108 attached to the host board 106, and the expected peripheral boards 110 attached to the interface boards 108. In some aspects, the identities of the expected host board 106, interface boards 108, and peripheral boards 110 are stored as a digital identification code. The configuration data 412 includes the power and communication requirements of each peripheral board 110 that may be coupled to the platform. These requirements may be in the form of specific configurations for components (e.g., level shifters, power sequencers, load switches) present on the interface board 108 that provide the peripheral board 110 with the required power and communication connections. One or more distinct configurations of the interface board 108 (or other aspects of interface boards, including peripheral-specific interface boards) stored as configuration data 412 are represented as a hardware schematic. Once design and testing of the system is complete, the configuration data can be used to generate schematics of the computing device as an end product by replacing the interface board 108 with the hardware schematic. The hardware schematic may exclude any circuitry on the interface board 108 that is not used for power and communication considerations of the attached peripheral. Therefore, the schematics of the final design may only include the circuitry that is needed to couple the core components of the host board 106 to the peripheral. Some specific examples of other data that may be included in the configuration data 412 include the preferred voltage for multi-voltage I/O signals, the preferred isolation for some I/Os, the preferred general-purpose I/Os (GPIOs) to control power for the peripherals, and the preferred device to use when multiple options are available for certain peripherals (e.g., sensors).

In some aspects, the intelligent module 402 provides a console to the debug bridge module 404. The debug bridge module 404 provides a connection for a monitoring station to connect to the modular system validation platform. The debug bridge module 404 couples to the interface boards 108 for monitoring power and signals passing through the interface boards 108 including, but not limited to, voltage and current level sensing, searching for leakage issues, and monitoring instrumentation amplifiers (INAs).

Figure 5:
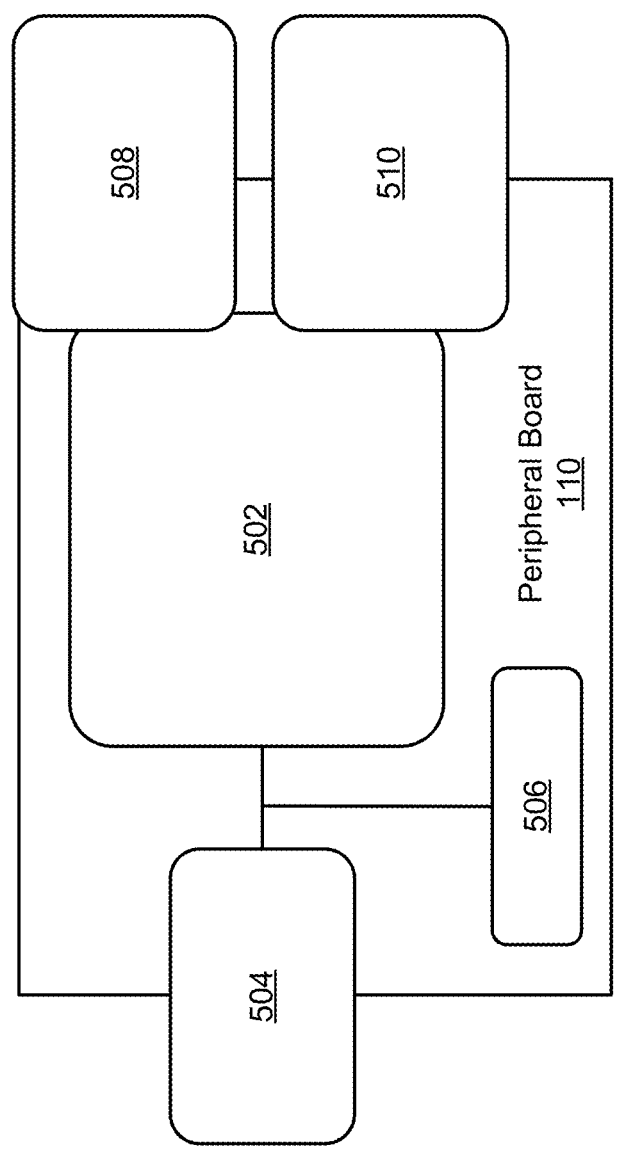
FIG. 5 illustrates the peripheral board from FIG. 2 that can be implemented in a modular system validation platform for computing devices.

FIG. 5 illustrates the peripheral board 110 from FIG. 2 that can be implemented in a modular system validation platform for computing devices. The peripheral board 110 includes a peripheral 502, a board connector 504, a CRM 506 (e.g., EEPROM), and optional connectors 508 and 510. The peripheral board 110 may include additional circuitry (not shown) specific to the peripheral 502. The peripheral 502 can be an input peripheral, output peripheral, CRM storage device, or battery. Some non-limiting examples of the peripheral are user input devices (e.g., mice, keyboards, trackballs, pens and pressure-sensitive pads, fingerprint readers), printers, scanners, hard drives, flash memory, WiFi and other network interfaces, sensors (e.g., cameras, temperature sensors, pressure sensors, motion sensors), audio-related peripherals (e.g., microphones, speakers, audio codecs), batteries, and universal serial bus (USB) controllers. In some aspects, multiple peripherals 502 may be mounted on a single peripheral board 110. For example, the peripheral board 110 may include multiple WiFi chipsets from different manufacturers. Muxing circuitry, either on the attached interface board 108 or on the peripheral board 110, can be implemented to switch between the different WiFi chipsets during testing.

The peripheral 502 may be coupled to the board connector 504 via predefined circuitry. Similar to the host board 106 and the interface board 108, the circuitry not being utilized for the function of the peripheral 502 may be excluded when generating the final schematics of the end product. The board connector 504 may be predefined; that is, the board connector 504 can be a common connector that couples to a generic interface board 108. In other aspects, the board connector can be a particular type of connector (e.g., USB-C connector) that can couple to a peripheral-specific interface board.

The CRM 506 may be coupled to a control plane interface and stores an identifier of the peripheral board 110. The identifier can be a digital ID code representing the type (or class) of peripheral board 110 and/or the specific peripheral 502 that is mounted on the peripheral board 110. In aspects, the interface board 108 may relay a peripheral identifier received via board connector 504 to the host board 106. The digital ID code can be used by the intelligent module 402 to identify the peripheral board 110 and determine whether the peripheral board 110 is supported by the configuration of the modular system validation platform being tested. If the peripheral board 110 is supported by the configuration data 412 stored on the intelligent module 402, then the intelligent module 402 may proceed to boot the platform. Alternatively, if the peripheral board 110 is not supported by or available in the configuration data, the intelligent module 402 can decide not to boot the platform or disable the peripheral board 110.

In some aspects, the peripheral board 110 includes one or more optional connectors (e.g., optional connectors 508 and 510). The optional connectors 508 and 510 are coupled to the peripheral 502 (e.g., peripheral IC) and can be used to connect the peripheral 502 to external devices, or they can be implemented to extend the chain of modular peripheral boards. For example, if the peripheral 502 is a WiFi adapter, the optional connectors 508 and 510 can be connectors for other types of wired or wireless network modules (e.g., RJ45 connectors).

Figures 1, 6:
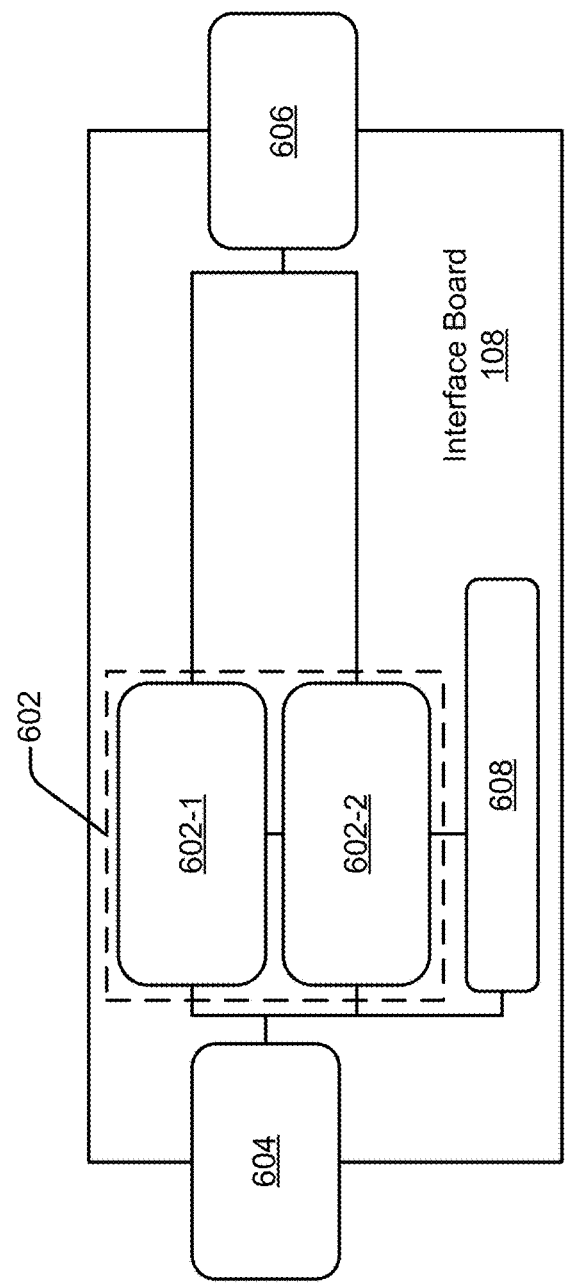
Figures 2, 6:
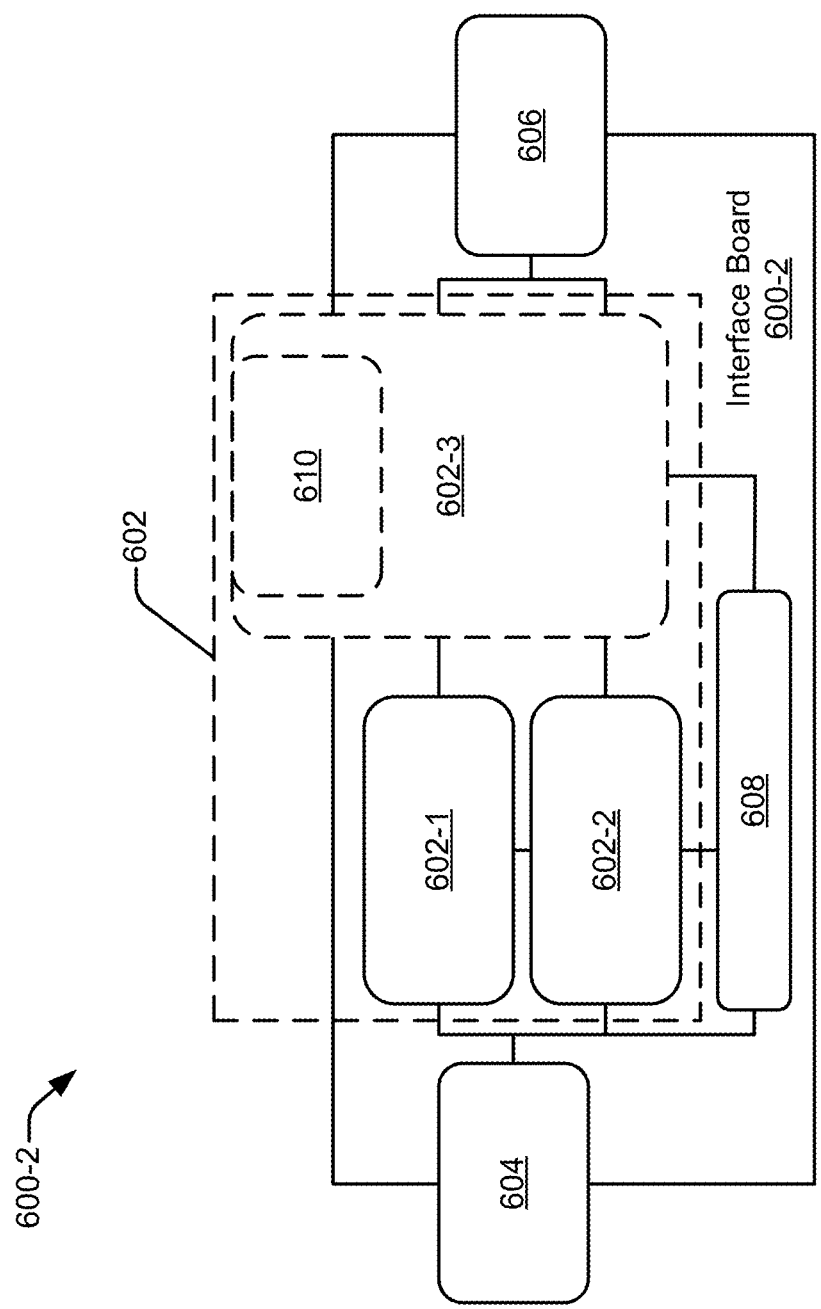
Figures 3, 6:
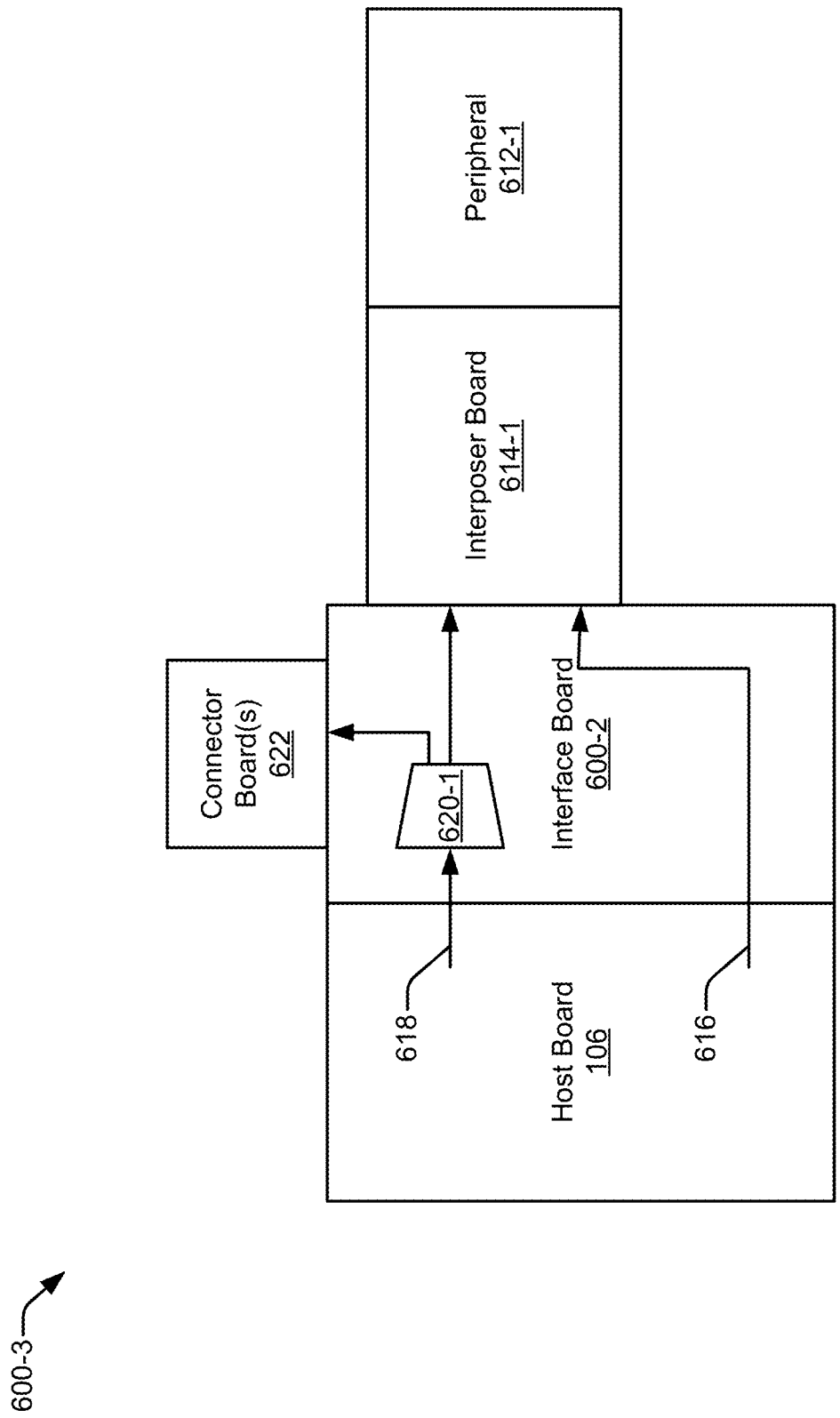
Figures 4, 6:
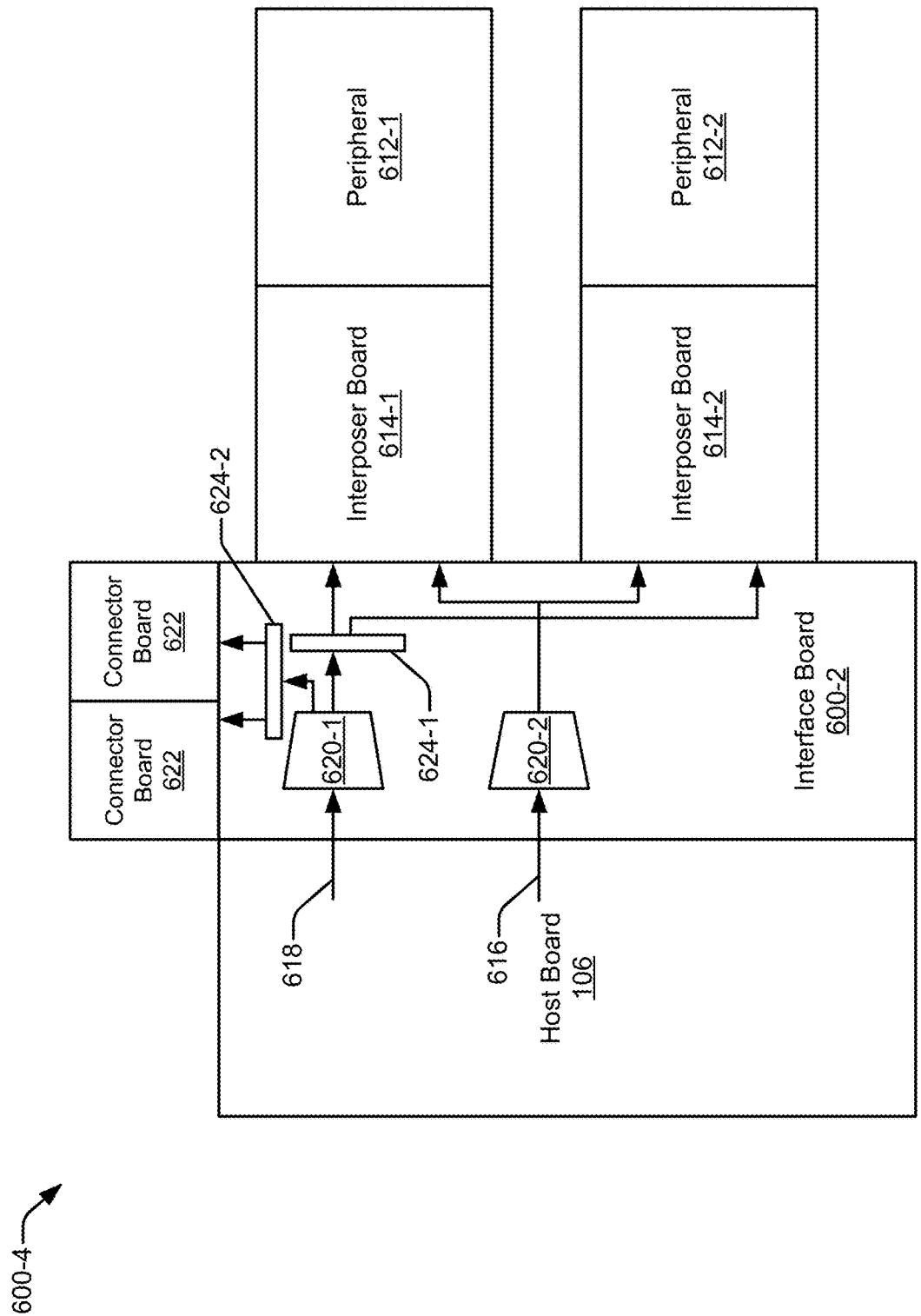

FIG. 6-1 illustrates the interface board 108 used in a modular system validation platform for computing devices. The interface board 108 includes interface circuitry 602 (and/or control circuitry, not shown) that enables the host board 106 to provide power to and communicate with the peripheral board 110. The interface board 108 also includes board connectors 604 and 606 (e.g., the board connectors of the interface board 108 included in the board connections 208-1 and 212, respectively) and board management logic 608 (e.g., control circuitry).

The board connector 604 can be configured to connect to a complementary board connector on multiple different host boards 106. The board connector 604 may include multiple power and signal pathways that enable the interface board 108 to be configured in multiple ways. In most cases, a portion or subset of these pathways is utilized in any distinct configuration of the interface board 108. In other words, for a given peripheral, not all of the available signaling lines and/or power rails of the board connector 604 will be used to support testing and operation of the peripheral. Likewise, the board connector 606 can be configured to connect to a complementary board connector 504 on multiple different peripheral boards 110, and the board connector 606 may include multiple power and signal pathways that may not be utilized by a particular peripheral board. In some aspects, the board connector 606 may be a common connector used for a standard communication protocol (e.g., USB, ethernet, serial).

The interface circuitry 602 can include level shifters 602-1, used to supply the peripheral board 110 with its required voltages, and load switches 602-2, used to sequence power to the peripheral board 110 for booting and powering down purposes. There are several level-shifting designs that may be implemented, alone or in combination, as represented by the level shifters 602-1. For example, an open-drain, non-inverting level shifting technique may be implemented using a Schottky diode (either direction), a field-effect transistor (FET) in pass configuration, the Schottky diode and the FET in pass configuration, or two FETs in pass configuration. In some cases, an open-drain inverting level-shifting technique utilizing an N-channel FET (NFET) or a P-channel FET (PFET) is implemented. Push-pull level-shifting techniques may be implemented by using a push-pull bidirectional level shifter, a semi-push-pull bidirectional level shifter, or a logic gate buffer. Alternatively, a feature providing no level-shifting using direct-connect may be implemented. In aspects, the level-shifting techniques configured for the attached peripheral board 110 may be represented in the schematics for the end product (with unused or unnecessary circuitry omitted).

In aspects, voltage rails provided by the host board 106 are coupled to the level shifters 602-1 and the load switches 602-2 via the board connector 604. The voltages at which power is provided by the host board may or may not match the voltages required by the peripheral 502. The interface circuitry may control or alter the power provided to the peripheral to provide the logically equivalent rails to enable operation of the peripheral. In some cases, a level-shifting manager (not shown) on the interface board 108 may monitor sequencing signals and either turn on or off the level-shifting components as appropriate.

The load switches 602-2 can manage the power sequencing of the peripheral board 110 by coupling and decoupling the required power rails, present on the host board 106, to the peripheral 502 in a set order during power up and down of the platform. In this manner, virtual rails are formed on the interface board 108 and coupled to the peripheral board 110 via board connector 606. The host board 106 may include multiple power rails, each with different voltages, with the power rails required by the peripheral board 110 being switched on by the load switches 602-2. Thus, the host board 106 does not need the routing of multiple separate power rails of the same voltage to each board connector 310 on the host board 106 that connects to an interface board 108.

The load switches 602-2 can be implemented to accommodate multiple behaviors. For example, power sequencing can be enabled based on determining whether the supplied power is on and is the appropriate power (e.g., power-good) for the peripheral board 110. In some cases, the load switches 602-2 have reverse current protection and/or over-current protection. The load switches 602-2 can also have power-good output verification for subsequent sequencing. In aspects, the load switches 602-2 can have varying on-time requirements, which may include a minimum on-time requirement (e.g., soft-start to avoid inrush) and a maximum on-time requirement (e.g., accommodation for poorly implemented power-on-reset circuits in ICs). The load switches 602-2 can, likewise, have an active discharge path or no active discharge path for the power rails.

In some aspects, the interface circuitry 602 or control circuitry of the interface board 108 includes debugging circuitry (not shown), which may be coupled with the control plane of the host board. In some aspects, the debugging circuitry or test points are not exposed on the interface board 108. The monitoring and debugging circuitry can be coupled to the debug bridge module of the host board on the control plane. Generally, the debugging circuitry enables the measurements of the power being distributed and the communications being facilitated by the interface circuitry 602 to be monitored. Additionally, the debugging circuitry may enable automatic testing on the platform. For example, an automatic test that continuously checks the analog voltage of various I/O lines or power rails in the system for leakage in any given power state may be enabled by the debugging circuitry.

The board management logic 608 includes control circuitry that is coupled to the interface circuitry 602 and can be, likewise, coupled to the intelligent module 402 on the control plane. The board management logic 608 may include a processor and a CRM (e.g., microcontroller) and manages the level shifters 602-1, the load switches 602-2, and any other logic that may be included in the interface circuitry in alternate implementations. The CRM of the board management logic 608 can include the identifier of the interface board 108. The identifier can be used to identify the interface board 108. For example, the identifier may be a digital ID code that represents the type of interface board 108. In some cases, the identifier is requested by the intelligent module 402 and is checked against the configuration data 412 on the intelligent module 402 to validate that the interface board 108 is expected in the current configuration of the modular system validation platform being tested.

In aspects, the board management logic 608 receives configuration data 412, based on the identity of the interface board 108, from the intelligent module 402. The configuration data 412 includes the configuration of the interface circuitry 602 useful to interface the peripheral board 110 to the host board 106 by the interface board 108. In some aspects, the intelligent module 402 may send a new configuration to the board management logic 608 to reconfigure the interface circuitry 602 in a different manner. This reconfiguration may be issued by the intelligent module 402 to test alternate implementations of the interface circuitry 602 (e.g., power sequencing or level-shifting, for circuit optimization), or the reconfiguration may be issued because a different peripheral board 110 is connected to the interface board 108 and detected by the intelligent module 402. Likewise, there may be other situations for the intelligent module 402 to command a reconfiguration not described herein.

FIG. 6-2 illustrates an example muxing interface board 600-2 that can be implemented in a modular system validation platform for computing devices. The muxing interface board 600-2 may include similar components as the interface board 108 (e.g., the level shifters 602-1, the load switches 602-2, the board connectors 604 and 606, the board management logic 608). In this example, the interface circuitry 602 further includes muxing circuitry 602-3 and one or more board connectors 610. The muxing circuitry 602-3 couples the level shifters 602-1, the load switches 602-2, and to the one or more board connectors 610 to one another. The muxing circuitry 602-3 may, likewise, be coupled to the board connector 606. The muxing circuitry 602-3 can be configured to switch or route power and communications between the board connector 604, via the level shifters 602-1 and the load switches 602-2, and respective ones of the multiple board connectors 606 and 610. FIGS. 6-3 and 6-4 illustrate some specific examples of the muxing interface board Example Configurations of a Muxing Interface Board FIGS. 6-3 and 6-4 illustrate example configurations 600-3 and 600-4 of the muxing interface board 600-2 used in a modular system validation platform for computing devices. In FIG. 3, the muxing interface board 600-2 is connected to the host board 106. The muxing interface board 600-2 may be connected to a peripheral 612-1. In some aspects, an interposer board 614-1 is used to couple the peripheral 612-1 (e.g., M.2 solid-state drive) to the muxing interface board 600-2. The interposer board 614-1 can align generic high-speed IOs 616 (HSIOs) to the peripheral 612-1 and couple GPIOs/low-speed IOs (LSIOs) 618 to the peripheral 612-1. The host board 106 may include a greater quantity of HSIOs than is required by the peripheral 612-1. The interposer board 614-1, being particular to a distinct type of peripheral 612-1, can couple or route the required HSIOs 616 for the peripheral 612-1 and may not pass the unused HSIOs. The interposer board 614-1 may include a CRM (not shown) that stores an identifier that describes the peripheral 612-1. Muxing circuitry 620-1 can switch GPIOs/LSIOs 618 between the interposer board 614-1 and other connector boards 622 that may be included on the muxing interface board 600-2.

FIG. 6-4 illustrates another example configuration 600-4 of the muxing interface board 600-2 used in a modular system validation platform for computing devices. The configuration 600-4 includes the same or similar circuitry as described with reference to configuration 600-3. Additionally, the configuration 600-4 includes a second peripheral 612-2, a second interposer board 614-2, a second muxing circuitry 620-2, and n-Pole Double Throw (nPDT) muxing circuitry 624-1 and 624-2 for routing power and/or I/O to different peripherals. The other connector boards 622 have been illustrated as two separate boxes for added clarity to the description.

The muxing circuitry 620-2 switches HSIOs between the interposer board 614-1 and 614-2. The interposer board 614-2 is coupled to the second peripheral 612-2. Two chains of interposer boards 614 and peripherals 612 are illustrated in the configuration 600-4; however, multiple chains of interposer boards 614 and peripherals 612 may be included in configuration 600-4. Likewise, the second peripheral 612-2 (or multiple peripherals 612) may be similar peripherals (e.g., same brand, same model) to the peripheral 612-1, or the peripherals 612 may be distinct from one another.

The nPDT muxing circuitry 624-1 switches the coupling of the GPIOs/LSIOs 618 between the multiple interposer boards 614, and the nPDT muxing circuitry 624-2 switches the coupling of the GPIOs/LSIOs 618 between the multiple other connector boards 622. Other configurations of muxing interface boards 600-2 can, likewise, be designed, with or without interposer boards 614, for particular configurations of peripherals 612. Some examples of other configurations can include USB-based muxing interface boards 600-2 (e.g. USB hubs or USB switches) and networking-based muxing interface boards 600-2.

Example Methods

FIGS. 7, 8-1, and 8-2 illustrate detailed example method(s) 700 and 800 for operation of an interface board used in a modular system validation platform for computing devices. The illustrated methods include operations (or steps), which may be performed by or with the control circuitry and/or interface circuitry of the interface board to implement various aspects of a module system validation platform as described herein. The operations or steps performed to implement the methods 700 and/or 800 are not necessarily limited to the order or combinations in which the operations are shown herein. As such, any of one or more of the operations may be repeated, combined, or reorganized to provide other operations or alternative methods in accordance with the aspects described herein.

Figure 7:
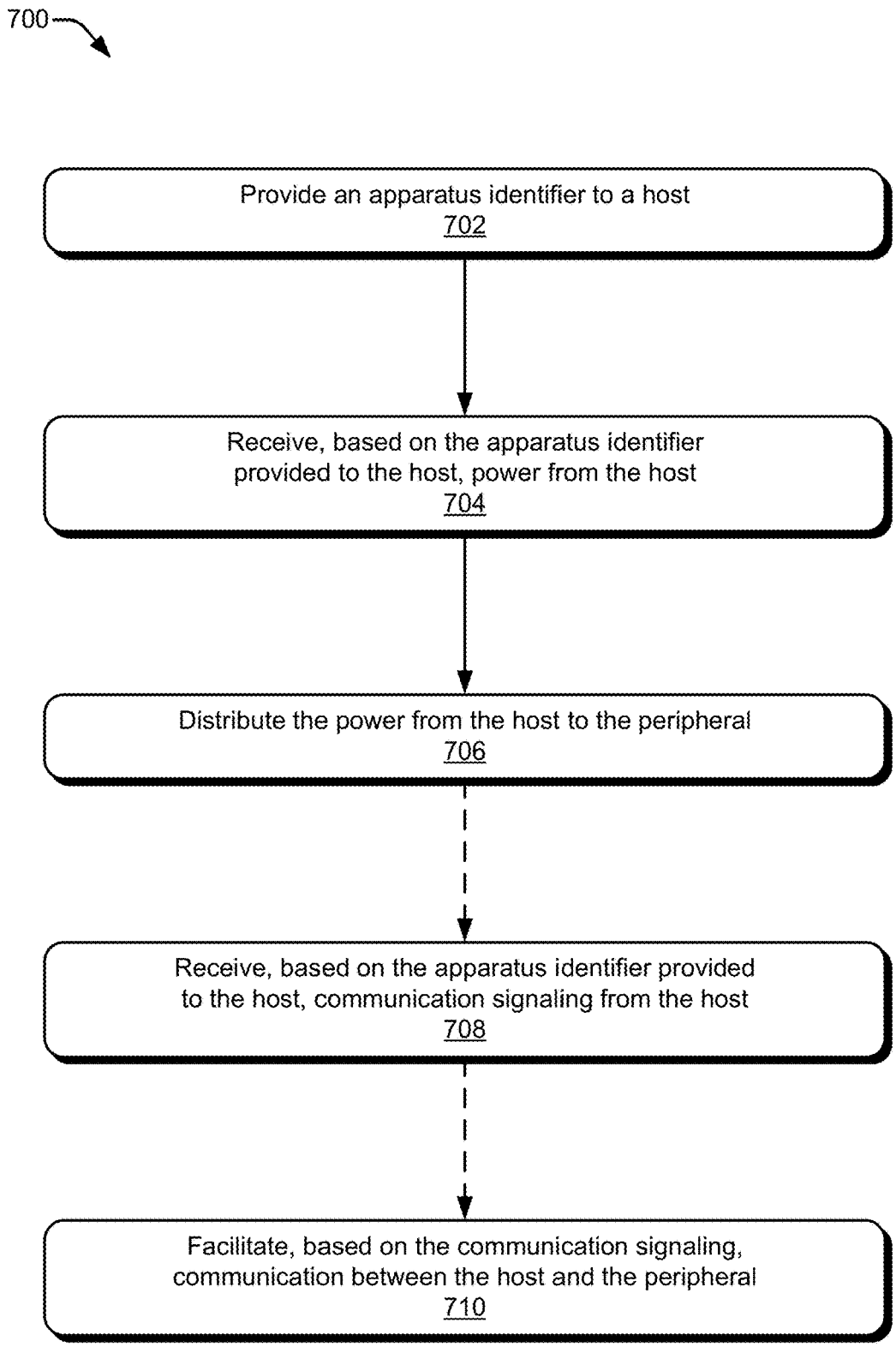
FIG. 7 illustrates example method(s) for operation of an interface board of a modular system validation platform in accordance with one or more aspects.

FIG. 7 illustrates example method(s) 700 for operation of an interface board of a modular system validation platform in accordance with one or more aspects. At step 702, an interface board provides an apparatus identifier to a host. The apparatus identifier may be a digital ID code stored in a CRM, a code implemented by hardware (e.g., a voltage divider circuit), or an identifier implemented by some other means. The apparatus identifier enables the host to verify that the attached interface board is expected as part of the validation platform and provide the correct configuration information to the interface board. Alternately or additionally, the interface board may provide or relay a peripheral identifier that identifies a specific peripheral, class of peripheral, or type of peripheral coupled to the interface board.

At step 704, the interface board receives, based on the apparatus identifier provided to the host, power from the host. Optionally, the power or a configuration for the interface board is provided by the host based on the apparatus identifier and/or a peripheral identifier. For example, the host or intelligent module may determine a configuration for the interface board and provide or sequence power through the interface board based on the apparatus identifier and/or the peripheral identifier. With respect to the power, the host may include one or more power rails that are at different voltage levels. These power rails may be provided to the interface board (e.g., through the connection between the host and the interface board); however, the interface board may couple, to a peripheral connector, only the power rails to be used by an attached peripheral. In some aspects, the interface board can interface a battery with the host. In these aspects, power can be supplied by the battery to the host via the interface board.

At step 706, the interface board distributes the power received from the host to the peripheral. The peripheral receives the power levels for which it is designed. Any other power levels are not distributed to the peripheral.

Optionally, at step 708, the interface board receives, based on the apparatus identifier provided to the host, communication signaling from the host. Optionally, the communication signaling or a configuration for the interface board is provided by the host based on the apparatus identifier and/or a peripheral identifier. For example, the host or intelligent module may determine a configuration for the interface board and provide or level-shifted communications through the interface board based on the apparatus identifier and/or the peripheral identifier. With respect to the communications, the communication signaling from the host may be specific to the type of peripheral connected to the interface board or functionalities provided by the interface board.

Optionally at step 710, the interface board facilitates, based on the communication signaling, communication between the host and the peripheral. Once the communication paths between the host and the peripheral are established on the interface board, the host and the peripheral may communicate as though they are connected directly to one another and the interface board is not present. Such communication my simulate integration of the peripheral with the host, with the configuration of the interface board being used as a basis for a circuit board schematic for subsequent phases of system integration.

Figures 1, 8:
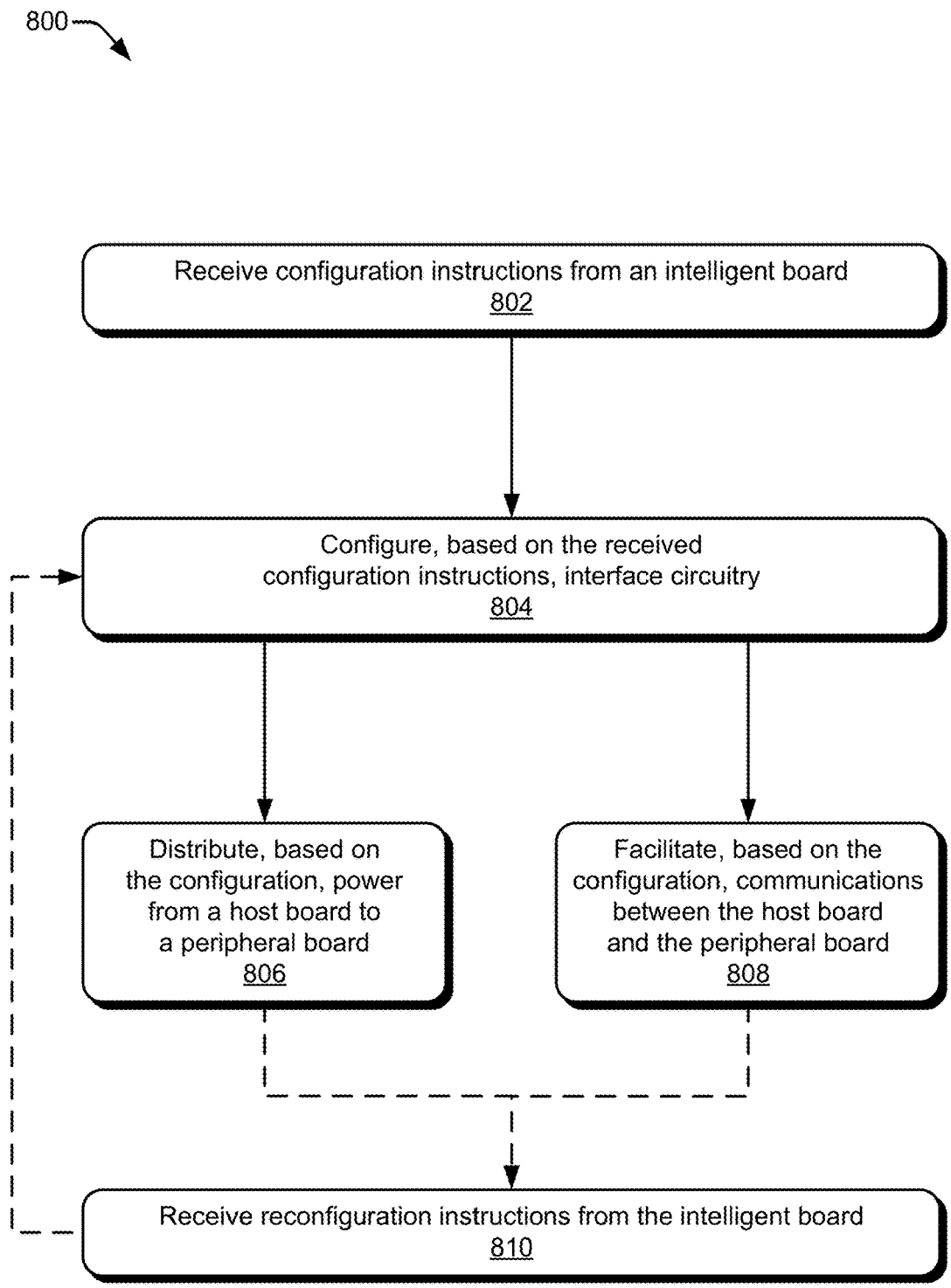
Figures 2, 8:
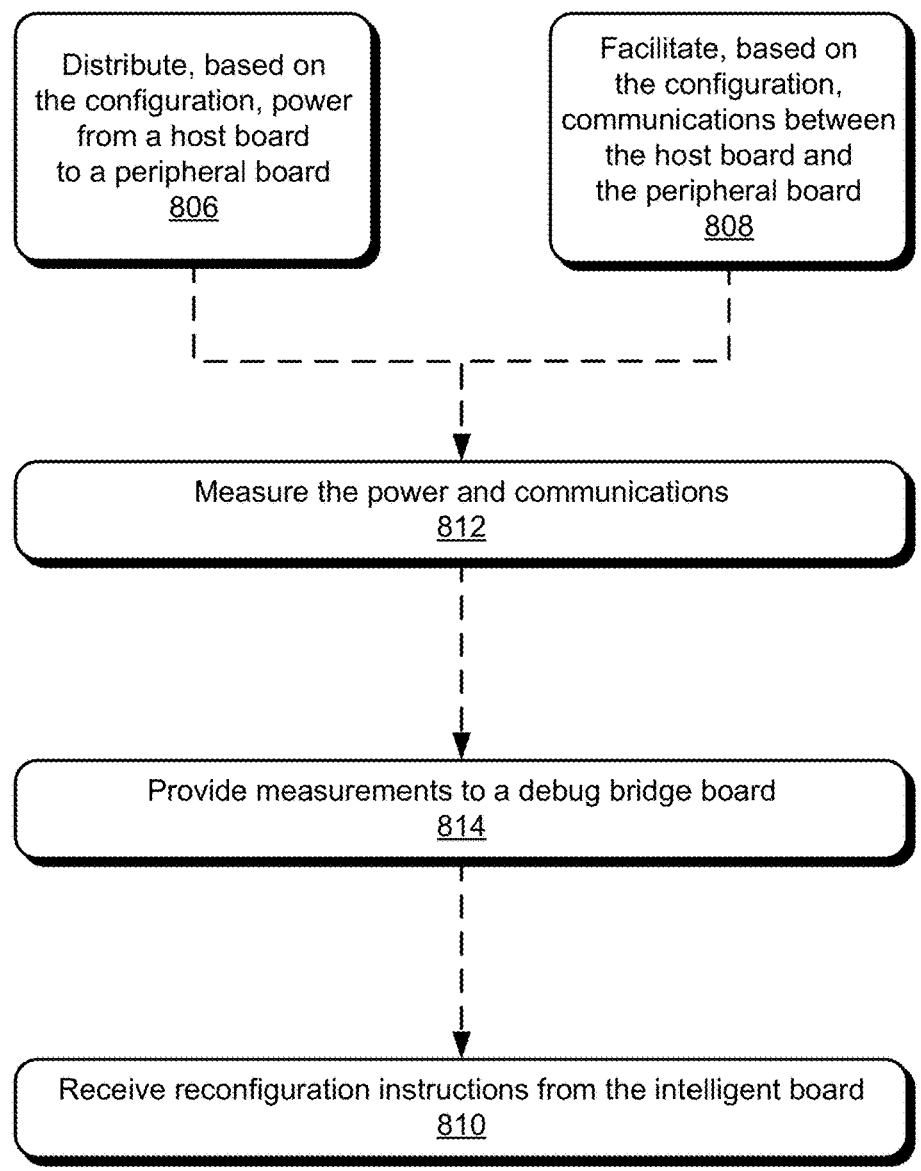

FIGS. 8-1 and 8-2 illustrate detailed example method(s) 800, 801 of operations implemented by an interface board of a modular system validation platform for computing devices. As illustrated in FIG. 8-1, at step 802, an interface board receives configuration instructions from an intelligent module of a host board. The intelligent module may send the configuration instructions based on configuration data stored in a CRM on the intelligent module. In some cases, the intelligent module selects or determines the configuration instructions based on an identifier provided by the interface board and/or a peripheral coupled to the interface board. The configuration instructions may be received and stored by control circuitry of the interface board, which in turn may configure interface circuitry of the interface board in response to receiving the configuration instructions.

At step 804, the interface board configures the interface circuitry present on the interface board based on the configuration instructions. In some cases, control circuitry of the interface board configures load switches of a power distribution network to a peripheral connector or sets parameters of level-shifters for translating signal levels between a host connector and the peripheral connector of the interface board. As noted, the control circuitry may configure the interface circuitry in response to receiving configuration instructions from the host board or the intelligent module.

At step 806, the interface board distributes power received from the host board to a peripheral board via the interface circuitry. For example, control circuitry of the interface board may selectively activate or deactivate the load switches to distribute and/or sequence power provided by the host board to the peripheral that is coupled to the interface board.

At step 808, the interface board facilitates communications between the host board and the peripheral board via the interface circuitry. For example, the level-shifters or other out-of-band signal lines of the interface board may facilitate the communications between the host board and the peripheral board coupled to the interface board. Other logic may, likewise, be present on the interface board (e.g., for signal filtering or status indications).

At step 810, the interface board may receive reconfiguration instructions from the intelligent module. The intelligent module may provide reconfiguration instructions based on a different interface configuration with the same peripheral, a different peripheral configuration, or upon detection of a hot-swapped peripheral. If reconfiguration instructions are received, steps 804 to 808 may be repeated.

FIG. 8-2 includes optional steps 812 and 814 illustrated at 801. At step 812, the power being distributed and the communications being facilitated are measured. The measurements may include voltage levels, current levels, I/O states, and/or other measurements that may be useful. At step 814, the measurements taken in step 812 are provided to a debug bridge module. In some cases, an intelligent board may provide a console interface to the debug module to enable the measurements to be monitored. In other cases, the debug module may include the console interface.

In this manner, a versatile and reconfigurable modular system validation platform for computing devices may be implemented for rapid prototyping and testing of multiple configurations of a platform. The modular system validation platform, as described herein, may reduce resources, time and costs associated with bringing a new computing device to market.

Various Examples

In the following, various examples of apparatuses and techniques of a modular system validation platform for computing devices are described.

Example 1: An apparatus for validating a system that includes a host and at least one peripheral, the apparatus comprising: a printed circuit board (PCB) including an apparatus identifier; a first connector coupled to the PCB and configured to couple to the host; a second connector coupled to the PCB and configured to couple to the peripheral; and interface circuitry coupled to the PCB between the first connector and the second connector, the interface circuitry configured to enable the host to operate with the peripheral by at least: providing the apparatus identifier to the host; and receiving, from the host, power based on the apparatus identifier provided to the host; and distributing the power from the host to the peripheral; or receiving, from the host, communication signaling based on the apparatus identifier provided to the host; and facilitating, based on the communication signaling, communication between the host and the peripheral.

Example 2: The apparatus of example 1, wherein the peripheral is a first peripheral and the apparatus further comprises control circuitry coupled to the interface circuitry, the control circuitry configured to: establish a first configuration of the interface circuitry to enable the host to operate with the first peripheral; detect a second peripheral coupled to the second connector or coupled to a third connector of the PCB that is configured to couple to another peripheral; and alter at least one operating characteristic of the interface circuitry to establish a second configuration of the interface circuitry to enable the host to operate with the second peripheral when coupled to the second connector or the third connector of the PCB.

Example 3: The apparatus of example 2, wherein the control circuitry is further configured to: receive, via the second connector, a first peripheral identifier from the first peripheral; provide the first peripheral identifier to the host; and receive, from the host, first configuration information useful to establish to the first configuration of the interface circuitry to enable the host to operate with the first peripheral; or receive, via the second connector or the third connector, a second peripheral identifier from the second peripheral; provide the second peripheral identifier to the host; and receive, from the host, second configuration information useful to establish the second configuration of the interface circuitry to enable the host to operate with the second peripheral.

Example 4: The apparatus of any one of the preceding examples, wherein the interface circuitry comprises: multiple level shifters configured to translate respective voltage levels of one or more signals provided from the host to one or more different voltage levels, the one or more signals with the different voltage levels provided to the peripheral; and one or more switches coupled to a power rail provided by the host and configured to distribute or sequence the power to the peripheral.

Example 5: The apparatus of any one of the preceding examples, wherein the second connector is a first peripheral connector and the apparatus further comprises: multiple peripheral connectors that include the first peripheral connector, the multiple peripheral connectors configured to couple the apparatus with multiple respective peripherals.

Example 6: The apparatus of example 5, further comprising: muxing circuitry configured to switch a power path or a communication path from the first connector of the apparatus and another of the multiple peripheral connectors to enable communication between the host and the respective peripheral coupled to the other peripheral connector.

Example 7: The apparatus of example 5 or example 6, wherein: the multiple respective peripherals comprise a class of peripherals or a type of peripherals; or the multiple peripheral connectors are configured to provide respective power and communication interfaces for the class of peripherals or the type of peripherals.

Example 8: The apparatus of example 2 or example 3, wherein the host comprises a host PCB, the host PCB comprising: a system-on-a-chip (SoC); a system configuration module configured to determine at least the first configuration or the second configuration of the interface circuitry of the apparatus; and a debug module configured to receive, from the apparatus, measurements of the power distributed by the apparatus or signal levels of the facilitated communication.

Example 9: The apparatus of example 8, wherein: the system configuration module comprises a system configuration module PCB that is configured to couple to the host PCB; or the debug module comprises a debug module PCB that is configured to couple to the host PCB.

Example 10: The apparatus of example 8 or example 9, wherein the system configuration module is further configured to: identify the apparatus using the apparatus identifier and determine the first configuration or the second configuration of the interface circuitry based on the apparatus identifier; or identify the first peripheral, a class of the first peripheral, or a type of the first peripheral based on the first peripheral identifier, and determine the first configuration of the interface circuitry based on the identity of the first peripheral, the class of the first peripheral, or the type of the first peripheral; or identify the second peripheral, a class of the second peripheral, or a type of the second peripheral based on the second peripheral identifier, and determine the second configuration of the interface circuitry based on the identity of the second peripheral, the class of the second peripheral, or the type of the second peripheral.

Example 11: The apparatus of any one of examples 8 to 10, wherein the control circuitry is configured to: receive, from the system configuration module, the first configuration information indicative of the first configuration of the interface circuitry; and configure the interface circuitry based on the first configuration information to establish the first configuration of the interface circuitry that enables the host to operate with the first peripheral; or receive, from the system configuration module, the second configuration information indicative of the second configuration of the interface circuitry; and configure the interface circuitry based on the second configuration information to establish the second configuration of the interface circuitry that enables the host to operate with the first peripheral.

Example 12: The apparatus of any one of examples 8 to 11, wherein for at least one of the first configuration and the first peripheral or the second configuration and the second peripheral: the interface circuitry corresponds to nets of a hardware schematic for the respective configuration of the interface circuitry that is useful to generate schematics for a system PCB that includes the SoC, the respective peripheral, and a portion of the interface circuitry based on the respective configuration of the interface circuitry between the SoC and the respective peripheral.

Example 13: The apparatus of any one of the preceding examples, wherein the interface circuitry is configured to enable at least one of: swapping of the first peripheral with the second peripheral or another peripheral without removing power from the apparatus; adding or removing the first peripheral, the second peripheral, or the other peripheral without removing power from the apparatus; detecting a presence of the first peripheral, the second peripheral, or the other peripheral when coupled to the apparatus; or establishing, based on a respective peripheral identifier, a respective configuration of the interface circuitry for the first peripheral, the second peripheral, or the other peripheral.

Example 14: The apparatus of any one of the examples 8 to 13, further comprising: monitoring circuitry configured to provide, to the debug module, measurements of the distributed by the apparatus or the signal levels of the facilitated communication.

Example 15: The apparatus of example 14, wherein the monitoring circuitry is further configured to provide the measurements to the debug module to facilitate automated testing of the distributed power or the facilitated communication on electrical paths that are not exposed on external layers on the PCB of the apparatus.

Example 16: A modular system validation platform comprising: a host PCB including a processor and at least one connector configured to couple to an apparatus as recited in any one of the preceding examples; a peripheral PCB including at least one peripheral and a connector configured to couple to the apparatus as recited in any one of the preceding examples; the apparatus as recited in any one of the preceding examples.

Example 17: A method for validating a system that includes a host and at least one peripheral, the method comprising: providing, by circuitry of an interface printed circuit board (PCB), an interface PCB identifier to the host, the interface PCB coupled between the host and the at least one peripheral; and receiving, by the circuitry of the interface PCB, power from the host based on the apparatus identifier provided to the host; and distributing, by the circuitry of the interface PCB, the power received from the host to the peripheral; or receiving, by the circuitry of the interface PCB, communication signaling from the host based on the interface PCB identifier provided to the host; and facilitating, by the circuitry of the interface PCB and based on the communication signaling, communication between the host and the peripheral.

Example 18: The method of example 17, wherein the peripheral is a first peripheral and the method further comprises: establishing, by control circuitry of the interface PCB, a first configuration of the circuitry of the interface PCB to enable the host to operate with the first peripheral; detecting, by the control circuitry, a coupling of a second peripheral to the interface PCB; altering, by the control circuitry, at least one operating characteristic of the circuitry of the interface PCB to establish a second configuration of the circuitry to enable the host to operate with the second peripheral when coupled to the interface PCB.

Example 19: The method of example 18, further comprising: receiving, by the control circuitry of the interface PCB, a first peripheral identifier from the first peripheral; providing, by the control circuitry, the first peripheral identifier to the host; and receiving, from the host, first configuration information useful to the control circuitry for establishing to the first configuration of the interface circuitry to enable the host to operate with the first peripheral; or receiving, by the control circuitry, a second peripheral identifier from the second peripheral; providing, by the control circuitry, the second peripheral identifier to the host; and receiving, from the host, second configuration information useful to the control circuitry for establishing the second configuration of the interface circuitry to enable the host to operate with the second peripheral.

Example 20: The method of any one of examples 17 to 19, further comprising: configuring one or more of multiple level shifters of the interface PCB to translate respective voltage levels of one or more signals provided from the host to one or more different voltage levels, the one or more signals with the different voltage levels provided to the peripheral; or configuring one or more load switches of the interface PCB to distribute or sequence the power provided to the peripheral.

Example 21: The method of any of the examples 17 to 20, further comprising: configuring monitoring circuitry of the interface PCB to provide measurements of at least one of the power distributed by the interface PCB or signal levels of the facilitated communication between the host and the at least one peripheral; and providing, to a debug module of the host, the measurements of the power distributed by the interface PCB or the signal levels of the facilitated communication between the host and the at least one peripheral.

CONCLUSION

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations of a modular system validation platform for computing devices have been described in language specific to certain features and/or methods, the subject of the appended claims is not necessarily limited to the specific features or methods described. Rather, the specific features and methods are disclosed as example implementations for modular system validation.

What is claimed is:

1. An apparatus for validating a system that includes a host and at least one peripheral, the apparatus comprising:
a printed circuit board (PCB) including an apparatus identifier;
a first connector coupled to the PCB and configured to couple to the host;
a second connector coupled to the PCB and configured to couple to the peripheral; and
interface circuitry coupled to the PCB between the first connector and the second connector,
the interface circuitry configured to receive, from the host, at least one of a first configuration or a second configuration of the interface circuitry of the apparatus,
for at least one of the first configuration and a first peripheral or the second configuration and a second peripheral, the interface circuitry corresponds to nets of a hardware schematic for the respective configuration of the interface circuitry that is useful to generate schematics for a system PCB that includes a system-on-a-chip (SoC), the respective peripheral, and a portion of the interface circuitry based on the respective configuration of the interface circuitry between the SoC and the respective peripheral, and
the interface circuitry is further configured to enable the host to operate with the respective peripheral by providing the apparatus identifier to the host and at least one of:
receiving, from the host, power based on the apparatus identifier provided to the host, and
distributing the power from the host to the respective peripheral; or
receiving, from the host, communication signaling based on the apparatus identifier provided to the host, and
facilitating, based on the communication signaling, communication between the host and the respective peripheral.

2. The apparatus of claim 1, wherein the peripheral is a first peripheral and the apparatus further comprises control circuitry coupled to the interface circuitry, the control circuitry configured to:
establish a first configuration of the interface circuitry to enable the host to operate with the first peripheral;
detect a second peripheral coupled to the second connector or coupled to a third connector of the PCB that is configured to couple to another peripheral; and
alter at least one operating characteristic of the interface circuitry to establish a second configuration of the interface circuitry to enable the host to operate with the second peripheral when coupled to the second connector or the third connector of the PCB.

3. The apparatus of claim 2, wherein the control circuitry is further configured to at least one of:
receive, via the second connector, a first peripheral identifier from the first peripheral;
provide the first peripheral identifier to the host; and
receive, from the host, first configuration information useful to establish to the first configuration of the interface circuitry to enable the host to operate with the first peripheral; or
receive, via the second connector or the third connector, a second peripheral identifier from the second peripheral;
provide the second peripheral identifier to the host; and
receive, from the host, second configuration information useful to establish the second configuration of the interface circuitry to enable the host to operate with the second peripheral.

4. The apparatus of claim 1, wherein the interface circuitry comprises:
multiple level shifters configured to translate respective voltage levels of one or more signals provided from the host to one or more different voltage levels, the one or more signals with the different voltage levels provided to the peripheral; and
one or more switches coupled to a power rail provided by the host and configured to distribute or sequence the power to the peripheral.

5. The apparatus of claim 1, wherein the second connector is a first peripheral connector and the apparatus further comprises:
multiple peripheral connectors that include the first peripheral connector, the multiple peripheral connectors configured to couple the apparatus with multiple respective peripherals.

6. The apparatus of claim 5, further comprising:
muxing circuitry configured to switch a power path or a communication path from the first connector of the apparatus and another of the multiple peripheral connectors to enable communication between the host and the respective peripheral coupled to the other peripheral connector.

7. The apparatus of claim 5, wherein at least one of:
the multiple respective peripherals comprise a class of peripherals or a type of peripherals; or
the multiple peripheral connectors are configured to provide respective power and communication interfaces for the class of peripherals or the type of peripherals.

8. The apparatus of claim 1, wherein the host comprises a host PCB, the host PCB comprising:
the system-on-a-chip (SoC);
a system configuration module configured to determine at least one of the first configuration or the second configuration of the interface circuitry of the apparatus; and
a debug module configured to receive, from the apparatus, at least one of measurements of the power distributed by the apparatus or signal levels of the facilitated communication.

9. The apparatus of claim 8, wherein at least one of:
the system configuration module comprises a system configuration module PCB that is configured to couple to the host PCB; or
the debug module comprises a debug module PCB that is configured to couple to the host PCB.

10. The apparatus of claim 8, wherein the system configuration module is further configured to at least one of:
identify the apparatus using the apparatus identifier and determine the first configuration or the second configuration of the interface circuitry based on the apparatus identifier;
identify the first peripheral, a class of the first peripheral, or a type of the first peripheral based on a first peripheral identifier, and determine the first configuration of the interface circuitry based on the identity of the first peripheral, the class of the first peripheral, or the type of the first peripheral; or
identify the second peripheral, a class of the second peripheral, or a type of the second peripheral based on a second peripheral identifier, and determine the second configuration of the interface circuitry based on the identity of the second peripheral, the class of the second peripheral, or the type of the second peripheral.

11. The apparatus of claim 8, further comprising control circuitry coupled to the interface circuitry, wherein the control circuitry is configured to at least one of:
receive, from the system configuration module, the first configuration information indicative of the first configuration of the interface circuitry; and
configure the interface circuitry based on the first configuration information to establish the first configuration of the interface circuitry that enables the host to operate with the first peripheral; or
receive, from the system configuration module, the second configuration information indicative of the second configuration of the interface circuitry; and
configure the interface circuitry based on the second configuration information to establish the second configuration of the interface circuitry that enables the host to operate with the first peripheral.

12. The apparatus of claim 1, wherein the interface circuitry is configured to enable at least one of:
swapping of the first peripheral with the second peripheral or another peripheral without removing power from the apparatus;
adding or removing the first peripheral, the second peripheral, or the other peripheral without removing power from the apparatus;
detecting a presence of the first peripheral, the second peripheral, or the other peripheral when coupled to the apparatus; or
establishing, based on a respective peripheral identifier, a respective configuration of the interface circuitry for the first peripheral, the second peripheral, or the other peripheral.

13. The apparatus of claim 8, further comprising:
monitoring circuitry configured to provide, to the debug module, measurements of the power distributed by the apparatus or the signal levels of the facilitated communication.

14. The apparatus of claim 13, wherein the monitoring circuitry is further configured to provide the measurements to the debug module to facilitate automated testing of at least one of the distributed power or the facilitated communication on electrical paths that are not exposed on external layers on the PCB of the apparatus.

15. The apparatus of claim 1, further comprising:
monitoring circuitry configured to provide to a debug module of the host at least one of:
measurements of the power distributed by the apparatus; or
measurements of signal levels of the facilitated communication on electrical paths that are not exposed on external layers on the PCB of the apparatus.

16. The apparatus of claim 1, further comprising:
control circuitry coupled to the interface circuitry, the control circuitry configured to establish a first configuration of the interface circuitry to enable the host to operate with the peripheral,
wherein the interface circuitry corresponds to nets of a hardware schematic for the first configuration of the interface circuitry that is useful to generate schematics for a system PCB that includes the SoC, the peripheral, and a portion of the interface circuitry based on the respective configuration of the interface circuitry between the SoC and the peripheral.

17. The apparatus of claim 1,
wherein the peripheral is a first peripheral and the apparatus further comprises control circuitry coupled to the interface circuitry, the control circuitry configured to:
establish a first configuration of the interface circuitry to enable the host to operate with the first peripheral;
detect a second peripheral coupled to the second connector or coupled to a third connector of the PCB that is configured to couple to another peripheral; and
alter at least one operating characteristic of the interface circuitry to establish a second configuration of the interface circuitry to enable the host to operate with the second peripheral when coupled to the second connector or the third connector of the PCB; and
wherein the interface circuitry is further configured to enable at least one of:
swapping of the first peripheral with the second peripheral or another peripheral without removing power from the apparatus;

adding or removing the first peripheral, the second peripheral, or the other peripheral without removing power from the apparatus;

detecting a presence of the first peripheral, the second peripheral, or the other peripheral when coupled to the apparatus; or establishing, based on a respective peripheral identifier, a respective configuration of the interface circuitry for the first peripheral, the second peripheral, or the other peripheral.

18. A method for validating a system that includes a host and at least one peripheral, the method comprising:

providing, by circuitry of an interface printed circuit board (PCB), an interface PCB identifier to the host, the interface PCB coupled between the host and the at least one peripheral and at least one of:

receiving, by the circuitry of the interface PCB, power from the host based on an apparatus identifier provided to the host, and distributing, by the circuitry of the interface PCB, the power received from the host to the peripheral; or receiving, by the circuitry of the interface PCB, communication signaling from the host based on the interface PCB identifier provided to the host, and facilitating, by the circuitry of the interface PCB and based on the communication signaling, communication between the host and the peripheral;

configuring monitoring circuitry of the interface PCB to provide measurements of at least one of the power distributed by the interface PCB or signal levels of the facilitated communication between the host and the at least one peripheral; and providing, to a debug module of the host, the measurements of the power distributed by the interface PCB or the signal levels of the facilitated communication between the host and the at least one peripheral.

19. The method of claim 18, wherein the peripheral is a first peripheral and the method further comprises:

establishing, by control circuitry of the interface PCB, a first configuration of the circuitry of the interface PCB to enable the host to operate with the first peripheral;

detecting, by the control circuitry, a coupling of a second peripheral to the interface PCB; and altering, by the control circuitry, at least one operating characteristic of the circuitry of the interface PCB to establish a second configuration of the circuitry to enable the host to operate with the second peripheral when coupled to the interface PCB.

20. The method of claim 19, further comprising at least one of:

receiving, by the control circuitry of the interface PCB, a first peripheral identifier from the first peripheral;

providing, by the control circuitry, the first peripheral identifier to the host; and receiving, from the host, first configuration information useful to the control circuitry for establishing the first configuration of interface circuitry to enable the host to operate with the first peripheral; or receiving, by the control circuitry, a second peripheral identifier from the second peripheral;

providing, by the control circuitry, the second peripheral identifier to the host; and receiving, from the host, second configuration information useful to the control circuitry for establishing the second configuration of the interface circuitry to enable the host to operate with the second peripheral.

21. The method of claim 18, further comprising at least one of:

configuring one or more of multiple level shifters of the interface PCB to translate respective voltage levels of one or more signals provided from the host to one or more different voltage levels, the one or more signals with the different voltage levels provided to the peripheral; or configuring one or more load switches of the interface PCB to distribute or sequence the power provided to the peripheral.

22. An apparatus for validating a system that includes a host and at least one peripheral, the apparatus comprising:

a printed circuit board (PCB) including an apparatus identifier;

a first connector coupled to the PCB and configured to couple to the host;

a second connector coupled to the PCB and configured to couple to the peripheral;

interface circuitry coupled to the PCB between the first connector and the second connector, the interface circuitry configured to enable the host to operate with the peripheral by providing the apparatus identifier to the host and at least one of:

receiving, from the host, power based on the apparatus identifier provided to the host, and distributing the power from the host to the peripheral; or receiving, from the host, communication signaling based on the apparatus identifier provided to the host, and facilitating, based on the communication signaling, communication between the host and the peripheral; and monitoring circuitry configured to provide, to a debug module of a host PCB, measurements of the power distributed by the apparatus or signal levels of the facilitated communication, the monitoring circuitry further configured to provide the measurements to the debug module to facilitate automated testing of at least one of the distributed power or the facilitated communication on electrical paths that are not exposed on external layers on the PCB of the apparatus.

\* \* \* \* \*